United States Patent
Kurokawa

(10) Patent No.: US 9,517,637 B2
(45) Date of Patent: Dec. 13, 2016

(54) IMAGING OPTICAL ELEMENT AND OPTICAL SCANNING APPARATUS INCLUDING THE SAME

(71) Applicant: CANON KABUSHIKI KAISHA, Tokyo (JP)

(72) Inventor: Shuichi Kurokawa, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/742,896

(22) Filed: Jun. 18, 2015

(65) Prior Publication Data

US 2015/0369971 A1 Dec. 24, 2015

(30) Foreign Application Priority Data

Jun. 24, 2014 (JP) ................................. 2014-129335

(51) Int. Cl.
*B41J 2/447* (2006.01)
*G02B 26/12* (2006.01)
*B41J 2/47* (2006.01)

(52) U.S. Cl.
CPC ............... *B41J 2/471* (2013.01); *B41J 2/447* (2013.01); *G02B 26/123* (2013.01); *G02B 26/125* (2013.01)

(58) Field of Classification Search
CPC ....... G02B 26/123; G02B 26/125; B41J 2/447
(Continued)

(56) References Cited

U.S. PATENT DOCUMENTS 6,831,763 B2 * 12/2004 Takakubo ............ G02B 26/123
347/244
6,961,164 B2 11/2005 Atsuumi
(Continued)

FOREIGN PATENT DOCUMENTS

JP 2002-214556 A 7/2002
JP 4418567 B2 2/2010
(Continued)

*Primary Examiner* — Kristal Feggins
*Assistant Examiner* — Kendrick Liu
(74) *Attorney, Agent, or Firm* — Carter, DeLuca, Farrell & Schmidt, LLP

(57) ABSTRACT

The imaging optical element includes an optical surface whose shape within a sub-scanning section has a non-circular shape. Assuming that a coordinate along a main scanning direction is Y and a coordinate along a sub-scanning direction is Z and that, within the sub-scanning section, a curvature radius on an optical axis of the optical surface is r, an eccentricity is k, a coefficient of variation in the curvature radius of the optical surface is $D_i$, and an aspherical surface coefficient is $G_{mn}Y^m$, when a shape S of the optical surface within the sub-scanning section is defined by an expression:

$$S = \frac{\frac{Z^2}{r'}}{1 + \sqrt{1-(1+k)\left(\frac{Z}{r'}\right)^2}} + \sum_{n=1}^{16}\sum_{m=0}^{16} G_{mn}Y^m Z^n,$$

$$r' = r\left(1 + \sum_{i=2}^{14} D_i Y^i\right)$$

the expression includes a term in which n is an odd number equal to or larger than 3, and the aspherical surface coeffi-
(Continued)

cient of at least one of the terms in which n is an odd number equal to or larger than 3 is changed asymmetrically along the main scanning direction.

9 Claims, 19 Drawing Sheets

(58) Field of Classification Search
USPC .................. 347/230, 241, 244, 256, 258; 359/205.1–207.5, 474, 481, 483, 668, 896
See application file for complete search history.

(56) References Cited

U.S. PATENT DOCUMENTS

| | | | |
|---|---|---|---|
| 8,531,738 B2* | 9/2013 | Shimomura | G02B 26/125 358/474 |
| 2002/0114051 A1 | 8/2002 | Atsuumi | |
| 2013/0176374 A1* | 7/2013 | Kurokawa | G02B 13/0005 347/224 |

FOREIGN PATENT DOCUMENTS

| | | |
|---|---|---|
| JP | 4883795 B2 | 2/2012 |
| JP | 2013-114095 A | 6/2013 |

* cited by examiner

COORDINATE OF OPTICAL SURFACE ALONG
MAIN SCANNING DIRECTION Y (mm)

LIGHT SOURCE SIDE

ANTI-LIGHT SOURCE SIDE

LIGHT SOURCE SIDE

ANTI-LIGHT SOURCE SIDE

IMAGING OPTICAL ELEMENT AND OPTICAL SCANNING APPARATUS INCLUDING THE SAME

BACKGROUND OF THE INVENTION

Field of the Invention

The present invention relates to an imaging optical element and an optical scanning apparatus including the same. More particularly, the present invention relates to a multi-beam optical scanning apparatus provided with a light source including a plurality of light-emitting parts (light-emitting points) in order to achieve high-speed and high-density recording and an imaging optical element used therefor, and is suitable for an image forming apparatus such as a laser beam printer, a digital copying machine, or a multifunction printer.

Description of the Related Art

Hitherto, a multi-beam optical scanning apparatus provided with a light source including a plurality of light-emitting parts has been widely used for a laser beam printer, a digital copying machine, or the like.

The multi-beam optical scanning apparatus is known to have such a configuration that a light flux is made incident on a deflecting surface of a deflection unit perpendicularly relative to a sub-scanning section (hereinafter referred to as "perpendicularly-incident optical system").

In the multi-beam optical scanning apparatus provided with the perpendicularly-incident optical system, in order to uniformize intervals along the sub-scanning direction between scanning lines drawn by respective light fluxes on the same scanned surface across an entire effective scanning area, a sub-scanning magnification of an imaging optical system between the deflecting surface of the deflection unit and the scanned surface is fixed across the entire effective scanning area.

Meanwhile, in recent years, for downsizing an apparatus, an optical scanning apparatus configured to scan a plurality of scanned surfaces with one deflection unit is used. In order to scan the plurality of scanned surfaces with one deflection unit, such a configuration that the light flux is made incident on the deflecting surface of the deflection unit obliquely relative to the sub-scanning direction (hereinafter referred to as "obliquely-incident optical system") has become frequently used.

In the multi-beam optical scanning apparatus provided with the obliquely-incident optical system, when the sub-scanning magnification of the imaging optical system is fixed across the entire effective scanning area, the intervals between the scanning lines along the sub-scanning direction are not uniform, which causes unevenness in the intervals.

In order to solve the problem, in Japanese Patent No. 4883795, there is disclosed a method of uniformizing the intervals between the scanning lines along the sub-scanning direction by causing the sub-scanning magnification of the imaging optical system to differ between a scanning starting side and a scanning ending side.

However, in the multi-beam optical scanning apparatus provided with the perpendicularly-incident optical system or the obliquely-incident optical system, when a manufacturing error such as an inclination or a shift, an assembly error, or the like occurs in optical components forming the imaging optical system or the like, a deviation from a designed value occurs in a position in which a plurality of light fluxes are imaged as a light spot on the scanned surface.

In particular, in regard to a deviation amount along the sub-scanning direction, the deviation amount differs depending on a scan position along a main scanning direction, and differs for each of the light fluxes from the plurality of light-emitting parts, and hence the unevenness in the intervals between the scanning lines along the sub-scanning direction occurs depending on the scan position along the main scanning direction, which degrades printing performance.

In order to solve the problem, in Japanese Patent No. 4418567, there is disclosed a method of optimizing a position of a main scanning stop configured to limit a light flux width in the main scanning direction and a focus distance of a collimator lens in accordance with the interval between the adjacent light-emitting parts along the main scanning direction and an fθ coefficient of the imaging optical system.

Further, in Japanese Patent Application Laid-Open No. 2013-114095, there is disclosed a method of optimizing a meridional shape of the imaging lens within the imaging optical system.

However, in the method disclosed in Japanese Patent No. 4418567, a limitation is imposed on the position of the main scanning stop and the focus distance of the collimator lens, which lowers a degree of freedom in designing the incident optical system.

Further, in the method disclosed in Japanese Patent Application Laid-Open No. 2013-114095, the meridional shape of the imaging lens within the imaging optical system is greatly bent toward an optical axis direction, and hence a limitation is imposed on an arrangement of the imaging optical system, which causes unnecessary increases in size and cost.

In order to solve the above-mentioned problem, it is desired to provide an optical scanning apparatus capable of reducing the unevenness in the intervals between a plurality of scanning lines along the sub-scanning direction due to the manufacturing error, the assembly error, or the like without lowering the degree of freedom for the incident optical system and without causing an unnecessary increase in size or cost.

SUMMARY OF THE INVENTION

Thus, according to one embodiment of the present invention, there is provided an imaging optical element, which is used for an optical scanning apparatus configured to deflect a light flux by a deflection unit and scan a scanned surface along a main scanning direction, the imaging optical element including an optical surface (lens surface) whose shape within a sub-scanning section has a non-circular shape, in which: assuming that a coordinate along the main scanning direction is Y and a coordinate along a sub-scanning direction is Z and that, within the sub-scanning section, a curvature radius on an optical axis of the optical surface is r, an eccentricity is k, a coefficient of variation in the curvature radius of the optical surface is $D_i$, and an aspherical surface coefficient is $G_{mn}Y^m$, when a shape S of the optical surface within the sub-scanning section is defined by an expression:

$$S = \frac{\frac{Z^2}{r'}}{1 + \sqrt{1 - (1+k)\left(\frac{Z}{r'}\right)^2}} + \sum_{n=1}^{16}\sum_{m=0}^{16} G_{mn}Y^m Z^n,$$

$$r' = r\left(1 + \sum_{i=2}^{14} D_i Y^i\right)$$

the expression includes a term in which n is an odd number equal to or larger than 3; and the aspherical surface coefficient of at least one of the terms in which n is an odd number equal to or larger than 3 is changed asymmetrically along the main scanning direction.

Further features of the present invention will become apparent from the following description of exemplary embodiments with reference to the attached drawings.

DESCRIPTION OF THE EMBODIMENTS

Now, an optical scanning apparatus according to the present invention is described with reference to the accompanying drawings. Note that, to facilitate a better understanding of the present invention, the drawings used for the following description may be drawn with a scale different from an actual one.

Note that, in the following description, a main scanning direction corresponds to a direction perpendicular to a rotation axis of a deflection unit and an optical axis of an optical system, and a sub-scanning direction corresponds to a direction parallel with the rotation axis of the deflection unit. Further, a main scanning section corresponds to a section perpendicular to the sub-scanning direction, and a sub-scanning section corresponds to a section including the optical axis of the optical system and the sub-scanning direction. Therefore, it should be noted that the main scanning direction and the sub-scanning section may change depending on the optical system.

Figure 1:
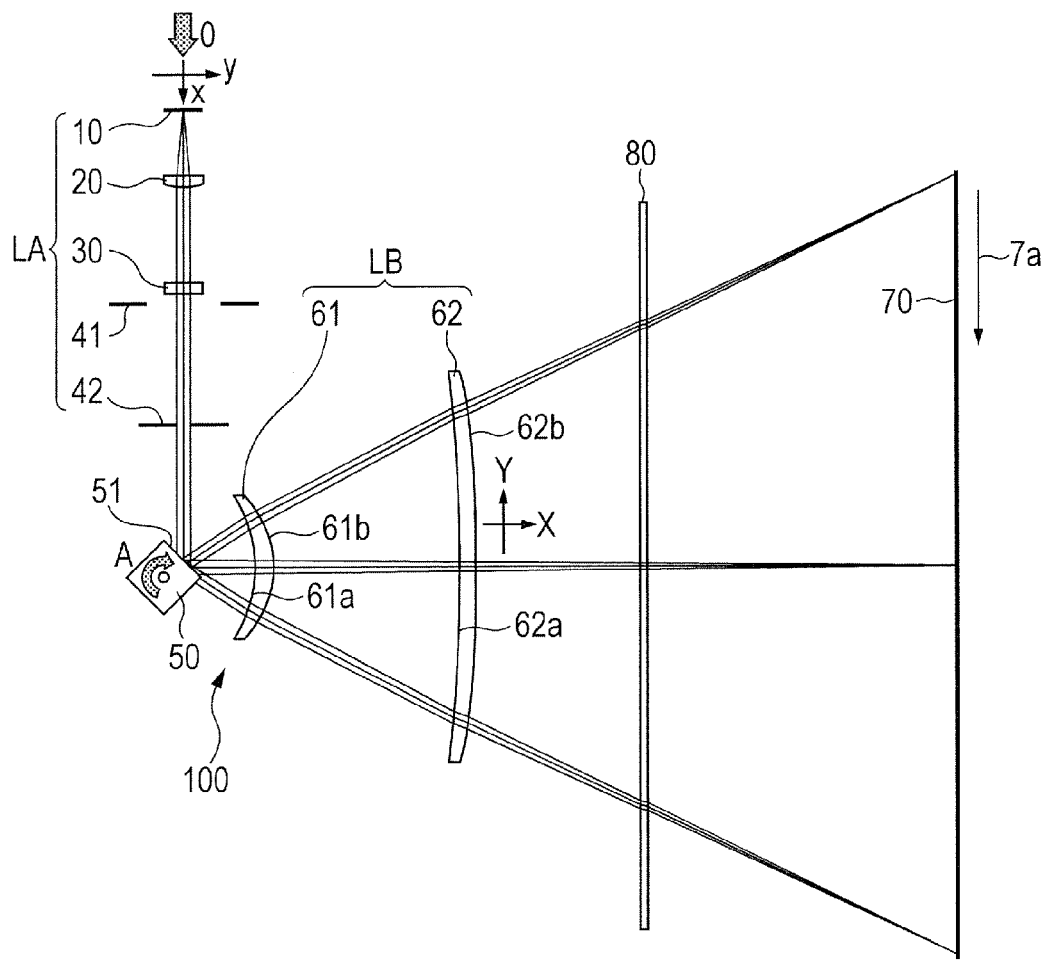
FIG. 1 is a main scanning sectional diagram of an optical scanning apparatus according to a first embodiment of the present invention.
Figure 2:
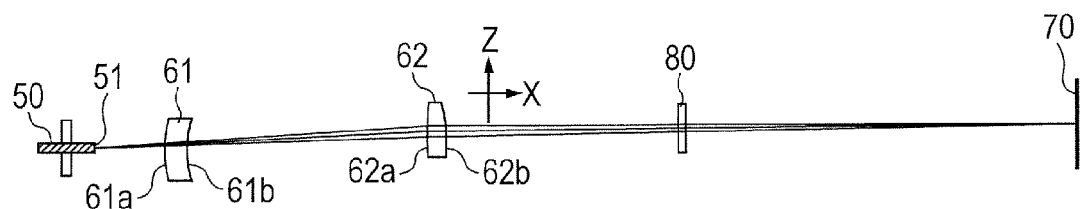
FIG. 2 is a sub-scanning sectional diagram of an imaging optical system of the optical scanning apparatus.
Figure 3:
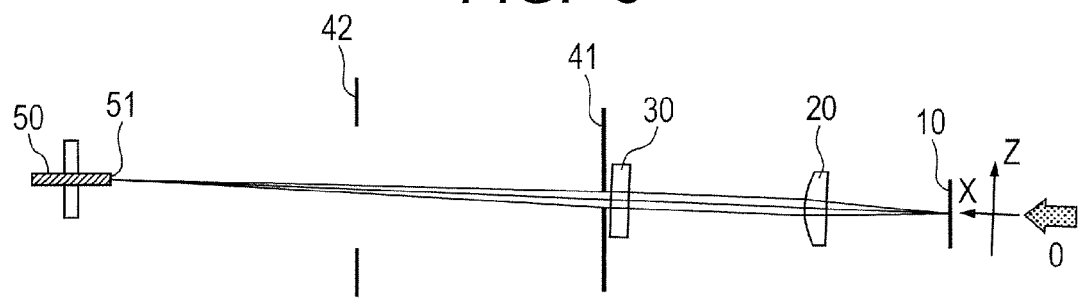
FIG. 3 is a sub-scanning sectional diagram of an incident optical system of the optical scanning apparatus.

FIG. 1 is a main scanning sectional diagram of an optical scanning apparatus 100 according to a first embodiment of the present invention. FIG. 2 is a sub-scanning sectional diagram of an imaging optical system LB of the optical scanning apparatus 100. FIG. 3 is a sub-scanning sectional diagram of an incident optical system LA of the optical scanning apparatus 100.

The optical scanning apparatus 100 includes a light source 10, a collimator lens 20, a cylindrical lens 30, a first aperture stop 41, and a second aperture stop 42. Further, the optical scanning apparatus 100 includes a deflection unit (rotary polygon mirror) 50, a first imaging lens 61, a second imaging lens 62, and a dustproof glass 80.

Note that, in the optical scanning apparatus 100 according to this embodiment, the incident optical system LA is formed of the light source 10, the collimator lens 20, the cylindrical lens 30, the first aperture stop 41, and the second aperture stop 42. Further, the imaging optical system LB is formed of the first imaging lens 61 and the second imaging lens 62.

Figure 4A:
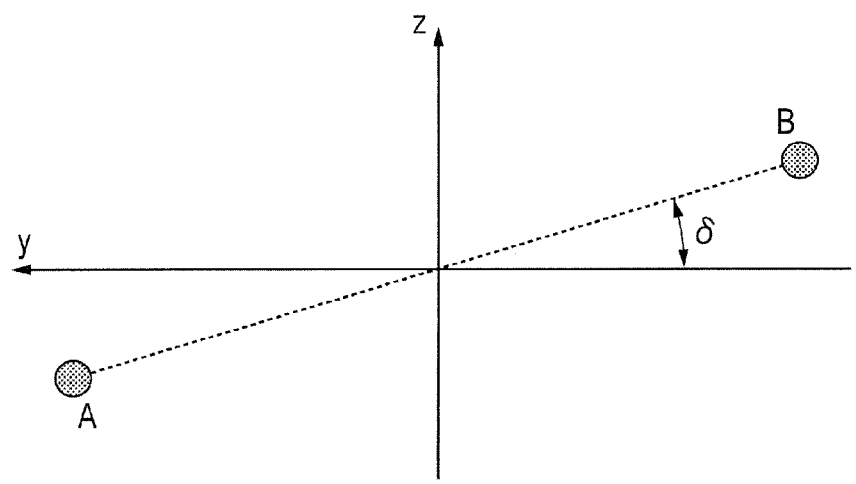
FIG. 4A is a diagram for illustrating an arrangement of two light-emitting parts A and B when viewed from a light source side.

The light source 10 is a monolithic multi-semiconductor laser (multi-beam light source) including two light-emitting parts A and B as illustrated in FIG. 4A.

The collimator lens 20 converts two light fluxes emitted from the two light-emitting parts A and B of the light source 10 into substantially parallel light fluxes. Note that, in this case, the wording "substantially parallel light flux" includes a weak divergent light flux, a weak convergent light flux, and a parallel light flux.

The cylindrical lens 30 condenses the light flux passing through the collimator lens 20 in the sub-scanning direction.

After that, in regard to the light flux, a light flux width thereof along the sub-scanning direction is limited by the first aperture stop 41, and a light flux width thereof along the main scanning direction is limited by the second aperture stop 42. Thus, the light flux is condensed only in the sub-scanning direction in the vicinity of a deflecting surface 51 of the deflection unit 50, and is imaged as a long-line image along the main scanning direction.

Note that, one anamorphic collimator lens having powers different between the main scanning direction and the sub-scanning direction may be used in place of the collimator lens 20 and the cylindrical lens 30.

The first imaging lens 61 and the second imaging lens 62 condense two light fluxes reflected and deflected by the deflection unit 50 onto a scanned surface 70 respectively as light spots.

While being rotated by a motor (not shown) in a direction indicated by the arrow A in the figure, the deflection unit 50 scans the scanned surface 70 in a direction indicated by the arrow 7a in the figure, and forms an electrostatic latent image on the scanned surface 70.

The scanned surface 70 is formed of, for example, a photosensitive drum surface.

The dustproof glass 80 is arranged to prevent dust, toner, or the like from entering inside the optical scanning apparatus 100.

The imaging optical system LB forms a so-called optical face tangle error correction optical system configured to establish a conjugate relationship between an imaging position (focal line position) in which the light flux is imaged by the cylindrical lens 30 in the vicinity of the deflecting surface 51 and the scanned surface 70 within the sub-scanning section.

As illustrated in FIG. 3, in the incident optical system LA of the optical scanning apparatus 100 according to this embodiment, the optical axis thereof is inclined by 3° relative to the main scanning section. In other words, the light flux emitted from the light source 10 is incident (obliquely incident) on the deflection unit 50 from a direction inclined toward the sub-scanning direction relative to the main scanning section. In other words, the optical scanning apparatus 100 according to this embodiment employs an obliquely-incident optical system.

Figure 4B:
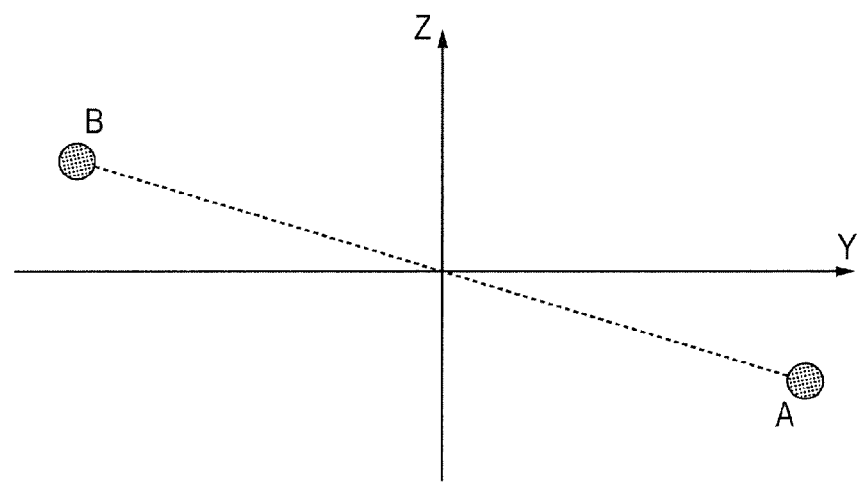
FIG. 4B is a diagram for illustrating positions in which light fluxes emitted from the two light-emitting parts A and B are imaged on a scanned surface.

FIG. 4A is a diagram for illustrating an arrangement of two light-emitting parts A and B when viewed from a light source 10 side. FIG. 4B is a diagram for illustrating a position in which light fluxes emitted from the two light-emitting parts A and B are imaged on the scanned surface 70.

As illustrated in FIG. 4A, the two light-emitting parts A and B of the light source 10 of the optical scanning apparatus 100 according to this embodiment are spaced apart from each other by 90 μm. Therefore, if the two light-emitting parts A and B are arrayed along the sub-scanning direction, an interval (pitch) between scanning lines along the sub-scanning direction on the scanned surface 70 becomes far larger than a desired interval defined based on a record density. Therefore, assuming that an optical axis direction is set to an X-axis, that the main scanning direction is set to a Y-axis, and that the sub-scanning direction is set to a Z-axis, the two light-emitting parts A and B are arranged as illustrated in FIG. 4A when viewed from a direction indicated by the arrow O of FIG. 1. In other words, in this embodiment, the two light-emitting parts A and B are arranged by being tilted obliquely, and an inclination angle δ is adjusted, to thereby adjust the interval between the scanning lines along the sub-scanning direction on the scanned surface 70 in accordance with the record density. In this embodiment, the angle δ is adjusted in accordance with the interval of 25.4 mm/600×1000=42.33 μm between the scanning lines at a time of a resolution of 600 dpi, and more specifically, δ=3.92°. Therefore, the two light-emitting parts A and B are spaced apart not only in the sub-scanning direction but also in the main scanning direction.

Figure 5:
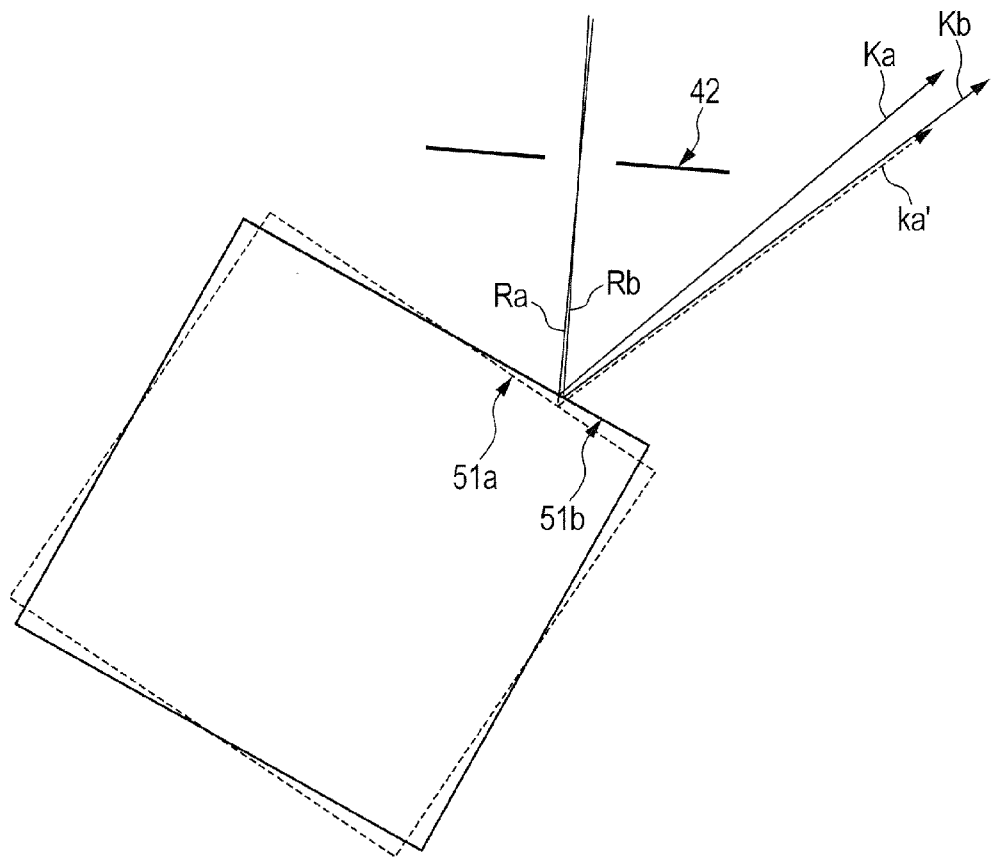
FIG. 5 is a diagram for illustrating how principal rays of the light fluxes emitted from the two light-emitting parts A and B are reflected by a deflecting surface.

FIG. 5 is a diagram for illustrating how principal rays of the light fluxes emitted from the two light-emitting parts A and B are reflected by the deflecting surface 51.

First, a light flux Rb emitted from the light-emitting part B is reflected by a deflecting surface 51b toward a direction indicated by the arrow Kb, and is condensed onto the scanned surface 70 by an imaging optical system 60.

If a light flux Ra emitted from the light-emitting part A is reflected by the deflecting surface 51b at the same timing, the light flux is reflected toward a direction indicated by the arrow Ka, and is condensed onto the scanned surface 70 by the imaging optical system 60.

In other words, two light fluxes Rb and Ra reflected by the deflecting surface 51b at the same timing progress toward the directions indicated by the arrows Kb and Ka different from each other, respectively. Therefore, the two light fluxes Rb and Ra emitted from the two light-emitting parts B and A are condensed onto the scanned surface 70 in positions spaced apart from each other in the main scanning direction.

Therefore, image data is sent by shifting a timing by a predetermined time period 6T so as to adjust a position in which the light flux Ra, which scans succeedingly along the main scanning direction, is condensed to a position in which the light flux Rb, which scans precedingly along the main scanning direction, is condensed onto the scanned surface 70.

In this manner, the light flux Ra emitted from the light-emitting part A is reflected by a deflecting surface 51a toward a direction indicated by the arrow Ka', and is condensed onto the scanned surface 70 in the same position as that of the light flux Rb scanning precedingly along the main scanning direction.

Table 1 is for showing various characteristics of the respective optical systems of the optical scanning apparatus 100 according to the first embodiment.

TABLE 1

| Configuration of incident optical system/imaging optical system | | | | Data on optical surface of imaging optical system | | | |
|---|---|---|---|---|---|---|---|
| | | | | First imaging lens | | Second imaging lens | |
| | | | | 61a surface | 61b surface | 62a surface | 62b surface |
| Wavelength of light source 10 | λ (nm) | 790 | Meridional line R | −3.52242E+01 | −2.60825E+01 | −5.00000E+02 | 4.52756E+03 |
| Number of light-emitting parts | n | 2 | K | 4.00206E−01 | −4.98269E−01 | 0.00000E+00 | 2.47351E+01 |
| Thickness of laser cover glass | deg (mm) | 0.25000 | B2 | 0.00000E+00 | 0.00000E+00 | 0.00000E+00 | 0.00000E+00 |
| Refractive index of laser cover glass | n0 | 1.51052 | B4 | −7.94385E−07 | −1.67241E−06 | 0.00000E+00 | −8.18332E−07 |
| Distance between light-emitting part and first surface of collimator lens 20 | d0 (mm) | 18.30500 | B6 | 4.77804E−08 | 1.79489E−08 | 0.00000E+00 | 2.03331E−10 |
| Curvature radius of first surface of collimator lens 20 | R1 (mm) | ∞ | B8 | −1.88017E−10 | −3.80662E−11 | 0.00000E+00 | −4.63275E−14 |
| Curvature radius of second surface of collimator lens 20 | R2 (mm) | −15.21639 | B10 | 2.16460E−13 | −1.42499E−14 | 0.00000E+00 | 5.04782E−18 |
| Thickness of collimator lens 20 | d1 (mm) | 3.00000 | B12 | 0.00000E+00 | 0.00000E+00 | 0.00000E+00 | 0.00000E+00 |
| Refractive index of collimator lens 20 | n1 | 1.76167 | | | | | |
| Distance between second surface of collimator lens 20 and first surface of cylindrical lens 30 | d2 (mm) | 27.17500 | Sagittal line r | 2.50000E+01 | 2.50000E+01 | 6.72041E+01 | −3.93184E+01 |
| Curvature radius of first surface of cylindrical lens 30 along sub-scanning direction | Rs3 (mm) | 41.03107 | k | 0.00000E+00 | 0.00000E+00 | 0.00000E+00 | 0.00000E+00 |
| Curvature radius of first surface of cylindrical lens 30 along main scanning direction | Rm3 (mm) | ∞ | D2u | 0.00000E+00 | 0.00000E+00 | 0.00000E+00 | 0.00000E+00 |
| Curvature radius of second surface of cylindrical lens 30 along sub-scanning direction | Rs4 (mm) | ∞ | D4u | 0.00000E+00 | −1.01812E−03 | 0.00000E+00 | 2.19788E−04 |
| Curvature radius of second surface of cylindrical lens 30 along main scanning direction | Rm4 (mm) | ∞ | D6u | 0.00000E+00 | 1.07403E−06 | 0.00000E+00 | −5.37734E−08 |
| Thickness of cylindrical lens 30 | d3 (mm) | 3.00000 | D8u | 0.00000E+00 | 1.02216E−09 | 0.00000E+00 | 2.41751E−11 |
| Refractive index of cylindrical lens 30 | n2 | 1.52397 | | 0.00000E+00 | −7.86035E−12 | 0.00000E+00 | −6.18982E−15 |
| Distance between second surface of cylindrical lens 30 and first aperture stop 41 | d4 (mm) | 3.15700 | D10u | 0.00000E+00 | 3.52700E−14 | 0.00000E+00 | 1.47563E−19 |
| Distance between first aperture stop 41 and second aperture stop 42 | d5 (mm) | 33.94350 | D12u | 0.00000E+00 | −9.81483E−17 | 0.00000E+00 | 0.00000E+00 |
| Distance between second aperture stop 42 and deflecting/reflecting surface 51 | d6 (mm) | 39.74450 | D14u | 0.00000E+00 | 4.22006E−19 | 0.00000E+00 | 0.00000E+00 |
| Distance between deflecting/reflecting surface 51 on axis and optical surface 61a | d7 (mm) | 20.00000 | D21 | 0.00000E+00 | −1.34972E−04 | 0.00000E+00 | 1.88869E−04 |
| Thickness of first imaging lens 61 | d8 (mm) | 5.00000 | D41 | 0.00000E+00 | −2.57645E−06 | 0.00000E+00 | −4.24498E−08 |

TABLE 1-continued

| Configuration of incident optical system/imaging optical system | | | Data on optical surface of imaging optical system | | | |
|---|---|---|---|---|---|---|
| | | | First imaging lens | | Second imaging lens | |
| | | | 61a surface | 61b surface | 62a surface | 62b surface |
| Wavelength of light source 10 | λ (nm) | 790 | | | | |
| Number of light-emitting parts | n | 2 | | | | |
| Refractive index of first imaging lens 61 | n3 | 1.52397 | D61 | 0.00000E+00 | 4.67739E-09 | 0.00000E+00 | 1.08310E-11 |
| Distance between optical surface 61b and optical surface 62a | d9 (mm) | 51.50000 | D81 | 0.00000E+00 | 2.56285E-11 | 0.00000E+00 | -3.15369E-15 |
| Thickness of second imaging lens 62 | d10 (mm) | 4.00000 | D101 | 0.00000E+00 | -3.13067E-14 | 0.00000E+00 | 6.16511E-19 |
| Refractive index of second imaging lens 62 | n4 | 1.52397 | D121 | 0.00000E+00 | -7.24060E-16 | 0.00000E+00 | 0.00000E+00 |
| Distance between optical surface 62b and first surface of dustproof glass 80 | d11 (mm) | 49.62080 | D141 | 0.00000E+00 | 2.42780E-18 | 0.00000E+00 | 0.00000E+00 |
| Thickness of dustproof glass 80 | d12 (mm) | 1.80000 | G0, 1 | | | -3.74303E-03 | -8.20000E-02 |
| Refractive index of dustproof glass 80 | n5 | 1.51052 | G1, 1 | | | 1.30162E-04 | 1.13879E-04 |
| Distance between second surface of dustproof glass 80 and scanned surface 70 | d13 (mm) | 83.28920 | G2, 1 | | | 1.18453E-05 | 2.14052E-05 |
| Incident angle in main scanning direction of deflection unit 50 of incident optical system LA | α (deg) | 90.00000 | G3, 1 | | | 1.22595E-06 | 1.03615E-06 |
| Incident angle in sub-scanning direction of deflection unit 50 of incident optical system LA | β (deg) | 3.00000 | G4, 1 | | | -5.22012E-09 | -1.03619E-08 |
| Effective scanning angle | γ (deg) | ±33.7034 | G5, 1 | | | -1.69045E-09 | -1.32291E-09 |
| Number of surfaces of deflection unit 50 | | 4 | G6, 1 | | | 7.38913E-12 | 9.34102E-12 |
| Circumradius of deflection unit 50 | Rpol (mm) | 10.00000 | G7, 1 | | | 1.30376E-12 | 9.56821E-13 |
| Center position of deflection unit 50 (in optical axis direction of imaging optical system LB) | PX (mm) | -5.57870 | G8, 1 | | | -7.74143E-15 | -7.29328E-15 |
| Center position of deflection unit 50 (in deflection scanning direction) | PY (mm) | -4.57630 | G9, 1 | | | -5.58022E-16 | -3.84053E-16 |
| Aperture stop diameter ((second aperture stop) × (first aperture stop)) | Rectangle (mm) | 3.60 × 2.08 | G10, 1 | | | 3.26067E-18 | 2.74730E-18 |
| | | | G11, 1 | | | 1.28442E-19 | 8.46577E-20 |
| | | | G12, 1 | | | -6.13027E-22 | -4.84846E-22 |
| | | | G13, 1 | | | -1.29544E-23 | -8.43748E-24 |
| | | | G0, 3 | | | | 0.00000E+00 |
| | | | G1, 3 | | | | -6.31950E-06 |
| | | | G2, 3 | | | | 4.71590E-08 |
| | | | G3, 3 | | | | 1.54371E-09 |
| | | | G4, 3 | | | | -1.36129E-11 |

*Refractive index is refractive index relative to wavelength of 790 nm

In Table 1, "E±x" represents "$10^{\pm x}$". Further, every coefficient is 0 unless otherwise specified.

A meridional shape (shape within the main scanning section) of each of optical surfaces 61a, 61b, 62a, and 62b of the first imaging lens 61 and the second imaging lens 62, which form the imaging optical system LB, is expressed by Expression (1).

$$X = \frac{\frac{Y^2}{R}}{1 + \sqrt{1 - (1+K)\left(\frac{Y}{R}\right)^2}} + \sum_{i=2}^{6} B_{2i} Y^{2i} \quad (1)$$

In the expression, assuming that the optical axis direction is the X-axis, the main scanning direction is the Y-axis, and the sub-scanning direction is the Z-axis with a point of intersection of each optical surface and the optical axis set as an origin, R represents a curvature radius, K represents an eccentricity, and $B_4$ to $B_{12}$ represent aspherical surface coefficients of meridional lines in the 4th order to 12th order. When a coefficient differs between on a positive side in a Y-axis direction (light source side) and on a negative side in the Y-axis direction (anti-light source side), a suffix u is appended to a coefficient on the positive side, and a suffix l is appended to a coefficient on the negative side.

Next, a sagittal shape (shape S within the sub-scanning section) of each of the optical surfaces 61a, 61b, 62a, and 62b of the first imaging lens 61 and the second imaging lens 62 is expressed by Polynomial Expressions (2) and (3).

$$S = \frac{\frac{Z^2}{r'}}{1 + \sqrt{1 - (1+k)\left(\frac{Z}{r'}\right)^2}} + \sum_{n=1}^{16} \sum_{m=0}^{16} G_{mn} Y^m Z^n \quad (2)$$

$$r' = r\left(1 + \sum_{i=2}^{14} D_i Y^i\right) \quad (3)$$

In the expression, k represents an eccentricity. Further, a curvature radius r' of a sagittal line expressed by Expression (3) changes in accordance with the position along the main scanning direction relative to a curvature radius r on the optical axis (Y=0), and $D_2$ to $D_{14}$ each represent a coefficient of variation in the curvature radius of the sagittal line. In the expression, when the coefficient differs between on the positive side in the Y-axis direction and on the negative side in the Y-axis direction, the suffix u is appended to the coefficient on the positive side, and the suffix l is appended to the coefficient on the negative side. Note that, in this embodiment, m and n assume 0 to 13 and 1 or 3, respectively, but can assume an arbitrary integer of at least 0.

Next, an aspherical surface coefficient $J_n$ is defined as in Expression (4).

$$J_n = \sum_{m=0}^{16} G_{mn} Y^m \quad (4)$$

$J_n$ changes in accordance with a position Y along the main scanning direction.

In this embodiment, the optical surfaces 62a and 62b of the second imaging lens 62 have a 1st-order (n=1) aspheric term of Z, and are each a tilt changing surface having an optical surface whose tilt amount along the sub-scanning direction changes in accordance with the position Y along the main scanning direction.

In addition, the optical surface 62b of the second imaging lens 62 on a scanned surface 70 side also has a 3rd-order (n=3) aspheric term of Z, and $J_3$ changes in accordance with the position Y along the main scanning direction.

Note that, in this embodiment, the second imaging lens 62 is arranged so as to be decentered by 4.0 mm in the sub-scanning direction relative to the main scanning section passing through a center in the sub-scanning direction of the deflecting surface 51 of the deflection unit 50.

Next, a method of suppressing variations in the interval between the scanning lines due to an assembly error, a manufacturing error, or the like of optical components in the optical scanning apparatus 100 according to this embodiment is described in detail.

Figure 6:
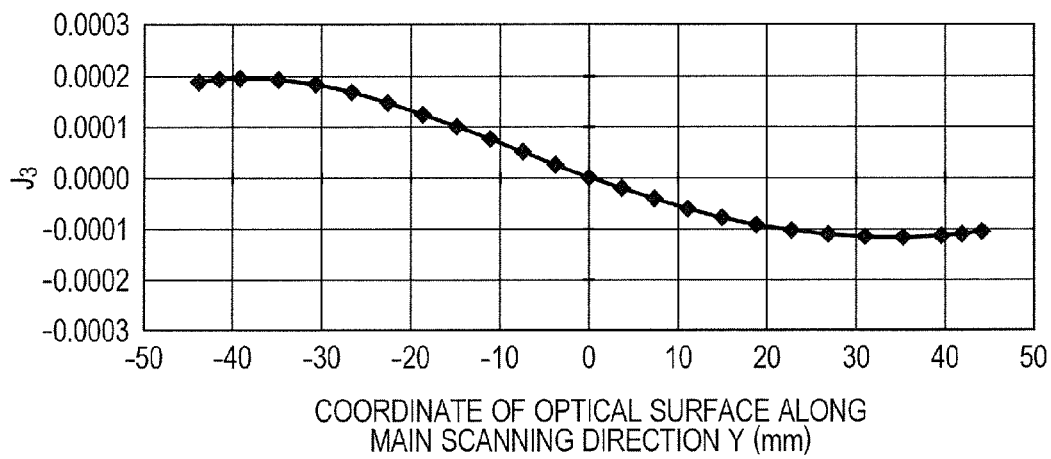
FIG. 6 is a graph for showing a change of $J_3$ with respect to a coordinate Y of an optical surface along the main scanning direction in the optical scanning apparatus according to the first embodiment.

FIG. 6 is a graph for showing a change of $J_3$ with respect to a coordinate Y of an optical surface along the main scanning direction in the optical scanning apparatus 100 according to this embodiment.

In the optical scanning apparatus 100 according to this embodiment, a sign of $J_3$ is negative at an effective range end portion (upper side of FIG. 1 and positive side of FIG. 6) on the light source side of the optical surface 62b. On the other hand, the sign of $J_3$ is positive at the effective range end portion (lower side of FIG. 1 and negative side of FIG. 6) on the anti-light source side. The sign of $J_3$ is set to be opposite between at a light source side end portion as one end portion and at an anti-light source side end portion as another end portion.

Figure 7A:
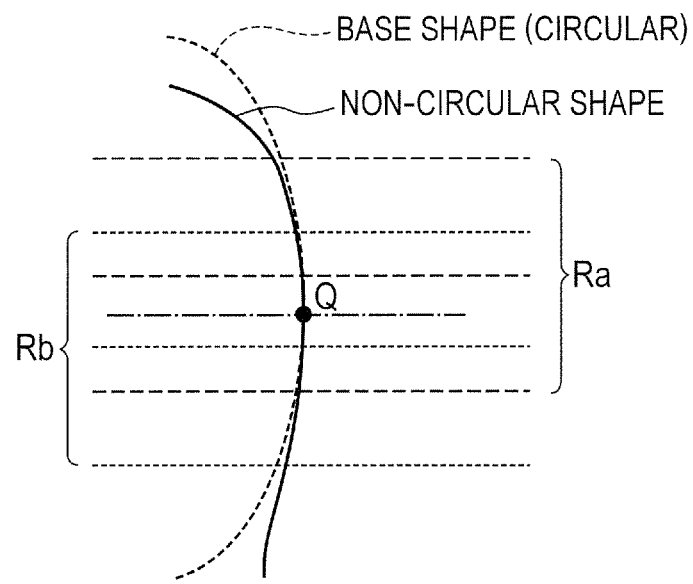
FIG. 7A is a sub-scanning sectional diagram of an optical surface of a second imaging lens at a light source side end portion thereof.
Figure 7B:
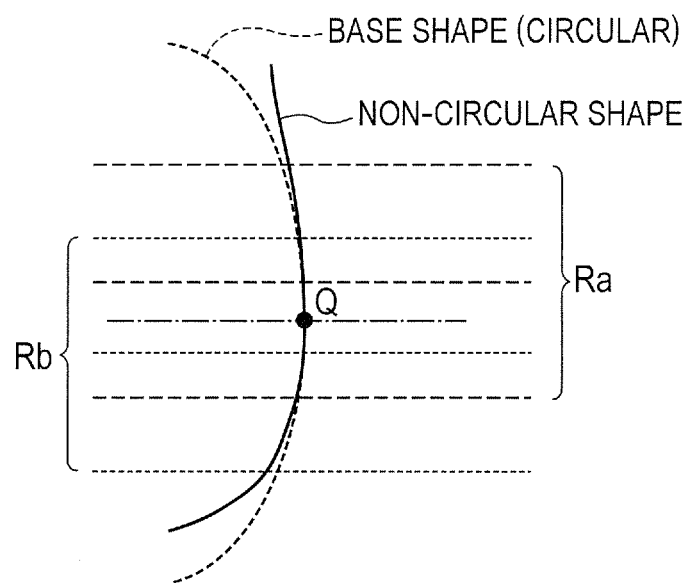
FIG. 7B is a sub-scanning sectional diagram of the optical surface of the second imaging lens at an anti-light source side end portion thereof.

FIG. 7A is a sub-scanning sectional diagram of the optical surface 62b of the second imaging lens 62 at the light source side end portion. FIG. 7B is a sub-scanning sectional diagram thereof at the anti-light source side end portion. Note that, in FIGS. 7A and 7B, for the sake of clarity in description, the 1st-order term (tilt component) of the sagittal line is removed.

Figure 8A:
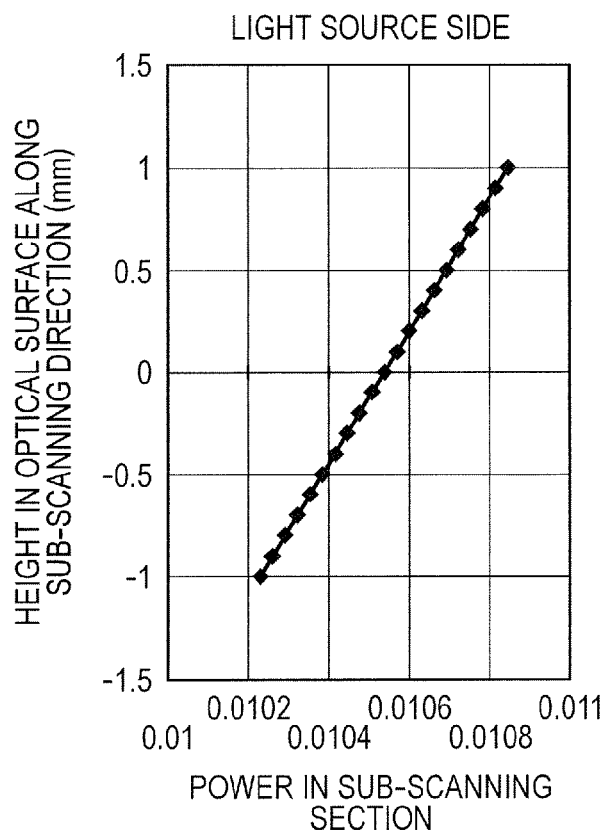
FIG. 8A is a graph for showing a relationship between a height in the optical surface along the sub-scanning direction and a power in a sub-scanning section at the light source side end portion of the optical surface of the second imaging lens.
Figure 8B:
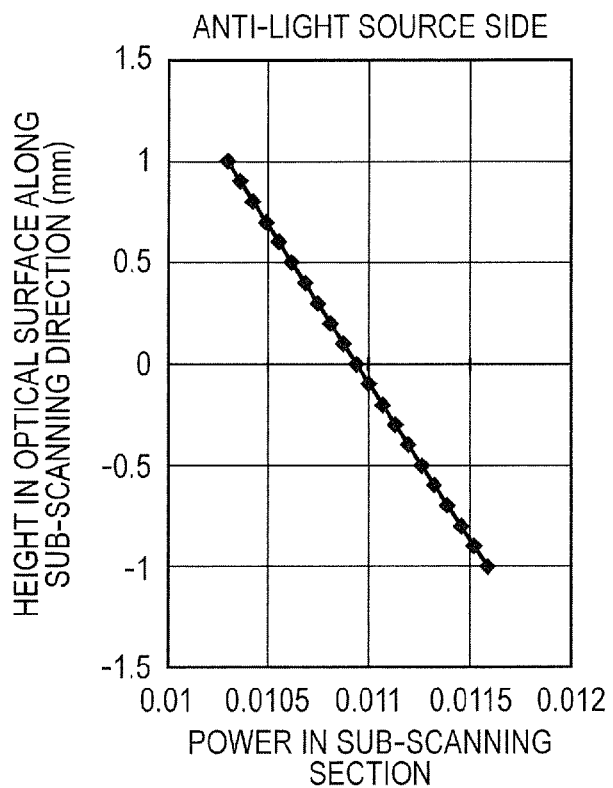
FIG. 8B is a graph for showing a relationship between a height in the optical surface along the sub-scanning direction and a power in the sub-scanning section at the anti-light source side end portion of the optical surface of the second imaging lens.

FIG. 8A is a graph for showing a relationship between the height in the optical surface along the sub-scanning direction and the power in the sub-scanning section at the light source side end portion of the optical surface 62b of the second imaging lens 62. Further, FIG. 8B is a graph for showing a relationship between the height in the optical surface along the sub-scanning direction and the power in the sub-scanning section at the anti-light source side end portion of the optical surface 62b of the second imaging lens 62.

The light fluxes Ra and Rb emitted from the two light-emitting parts A and B each pass through a position deviating relatively in the sub-scanning direction in the optical surface 62b of the second imaging lens 62.

As shown in FIG. 8A, at the light source side end portion at which the sign of $J_3$ is negative, in an upper portion of the optical surface 62b in the sub-scanning direction, the power is stronger than that of a base circular shape due to a sagittal shape having a 3rd-order non-circular shape, while the power is weaker in the lower portion of the sub-scanning direction.

On the other hand, at the anti-light source side end portion at which the sign of $J_3$ is positive, the power is weaker in the upper portion of the sub-scanning direction, while the power is stronger in the lower portion of the sub-scanning direction.

Next, consideration is given to a case where the second imaging lens 62 shifts upward in the sub-scanning direction due to an assembly error. In this case, the position through which the light flux passes shifts relatively toward a lower side in the sub-scanning direction.

On the light source side, as illustrated in FIG. 8A, the power of the optical surface 62b of the second imaging lens 62 becomes weaker as the height becomes lower along the sub-scanning direction. Thus, a wavefront is delayed compared to a time before the second imaging lens 62 shifts.

Further, as shown in FIG. 7A, the light flux Ra passes through the optical surface 62b of the second imaging lens 62 in an upper position in the sub-scanning direction than the light flux Rb. Then, as illustrated in FIG. 4B, when the light fluxes are deflected by the same deflecting surface 51 at the same timing, the light flux Ra is imaged on the scanned surface 70 in the lower position along the sub-scanning direction than the imaging position of the light flux Rb contrary to the case in the optical surface 62b. In this case, on the scanned surface 70 illustrated in FIG. 4B, a center between the imaging positions of the two light fluxes Ra and Rb is set as an origin, and the same coordinate axes X, Y, and Z as those of the optical surface 62b are set.

Therefore, the wavefront is delayed to cause the imaging position of the light flux Ra to deviate toward an upper side than in a case where the sagittal shape does not have a 3rd-order non-circular shape. In this case, the imaging position is defined as the center of gravity of the intensity distribution of a spot in which the light flux is imaged on the scanned surface 70.

On the other hand, the light flux Rb is imaged on the scanned surface 70 in an upper position than the imaging position of the light flux Ra, and hence the wavefront is delayed to cause the imaging position of the light flux Rb to deviate toward a lower side than in the case where the sagittal shape does not have a 3rd-order non-circular shape.

Therefore, in this embodiment, at the light source side end portion, an interval along the sub-scanning direction between the imaging positions of the light fluxes Ra and Rb on the scanned surface 70 becomes smaller than in the case where the sagittal shape does not have a 3rd-order non-circular shape.

Next, on the anti-light source side, as shown in FIG. 8B, the power of the optical surface 62b of the second imaging lens 62 becomes stronger as the height becomes lower along the sub-scanning direction. Thus, the wavefront is advanced compared to the time before the second imaging lens 62 shifts.

Therefore, the wavefront is advanced to cause the imaging position of the light flux Ra to deviate toward a lower side than in the case where the sagittal shape does not have a 3rd-order non-circular shape.

On the other hand, the imaging position of the light flux Rb deviates toward an upper side than in the case where the sagittal shape does not have a 3rd-order non-circular shape.

Therefore, in this embodiment, at the anti-light source side end portion, the interval along the sub-scanning direction between the imaging positions of the light fluxes Ra and Rb on the scanned surface 70 becomes larger than in the case where the sagittal shape does not have a 3rd-order non-circular shape.

Figure 9:
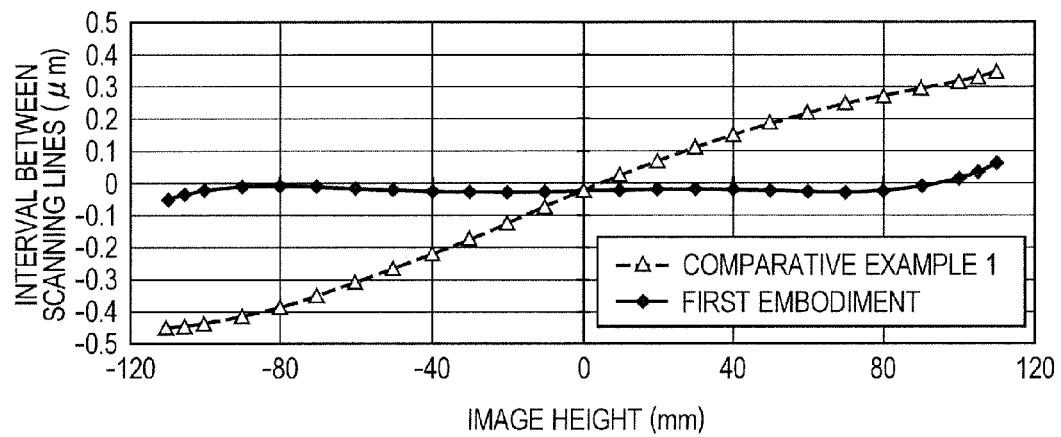
FIG. 9 is a graph for showing an interval between scanning lines of light fluxes Ra and Rb with each image height on the scanned surface, which is obtained when the second imaging lens shifts upward in the sub-scanning direction by 0.1 mm in the optical scanning apparatus according to the first embodiment.

FIG. 9 is a graph for showing the interval between the scanning lines of the light fluxes Ra and Rb with each image height on the scanned surface 70, which is obtained when the second imaging lens 62 shifts upward in the sub-scanning direction by 0.1 mm in the optical scanning apparatus 100 according to this embodiment. Note that, in FIG. 9, the interval between the scanning lines is shown as a deviation from 42.33 μm that is an ideal interval between the scanning lines. Further, in FIG. 9, Comparative Example 1 in which the sagittal shape of the optical surface 62b of the second imaging lens 62 does not have a 3rd-order non-circular shape is also shown for the sake of comparison.

As shown in FIG. 9, it is understood that a varying amount of the interval between the scanning lines of the light fluxes Ra and Rb can be reduced by employing this embodiment. In Comparative Example 1 that does not employ this embodiment, the imaging lens does not include the optical surface in which the sagittal shape has a 3rd-order non-circular shape, and hence the varying amount of the interval between the scanning lines differs depending on the image height. In addition, the sign is different between in the light source side end portion and in the anti-light source side end portion. Thus, in the optical surface 62b of the second imaging lens 62 of the optical scanning apparatus 100 according to this embodiment, $J_3$ is changed asymmetrically in the main scanning direction, and the sign is reversed between the light source side end portion and the anti-light source side end portion. Accordingly, the varying amount of the interval between the scanning lines of the light fluxes Ra and Rb can be reduced.

An inclination direction of the varying amount of the interval between the scanning lines is determined by the arrangement, namely, the inclination direction, of the two light-emitting parts A and B of the light source 10. In the optical scanning apparatus 100 according to this embodiment, the light-emitting parts A and B of the light source 10 are arranged as illustrated in FIG. 4A, and hence the varying amount of the interval between the scanning lines is inclined so as to become positive on the light source side and negative on the anti-light source side as shown in Comparative Example 1 of FIG. 9.

Then, in order to cancel the inclination direction, a change in $J_3$ of the optical surface 62b of the second imaging lens 62 of the optical scanning apparatus 100 according to this embodiment is set so as to become negative on the light source side and positive on the anti-light source side as shown in FIG. 6.

A relationship in terms of the arrangement of the light-emitting parts A and B and a relationship in terms of the imaging positions of the two light fluxes emitted from the light-emitting parts A and B on the scanned surface 70 correspond to each other on a one-to-one basis. Thus, $J_3$ of the optical surface 62b is changed so that, when the same coordinate axes X, Y, and Z are defined for the optical surface 62b and on the scanned surface 70, the inclination direction of the change in $J_3$ of the optical surface 62b (FIG. 6) has the same sign as the inclination direction between the imaging positions in which the light fluxes emitted from the two light-emitting parts A and B and deflected and reflected by the deflecting surface 51 at the same timing are imaged on the scanned surface 70 (FIG. 4B). In other words, $J_3$ of the optical surface 62b is changed so that a positive-negative relationship of an inclination of the change in $J_3$ of the optical surface 62b (FIG. 6) exhibits the same sign as the inclination direction (positive-negative relationship) of a straight line obtained by connecting between imaging spots of the light fluxes emitted from the two light-emitting parts A and B at the same timing (FIG. 4B). With this configuration, it is possible to reduce the varying amount of the interval between the scanning lines.

As illustrated in FIG. 7A and FIG. 7B, in this embodiment, the respective light fluxes Ra and Rb emitted from the light-emitting parts A and B pass through the positions spaced apart from each other in the sub-scanning direction in the optical surface 62b. If an amount by which the light fluxes Ra and Rb are spaced apart from each other is too large, a difference between the power of the optical surface 62b in the position through which the light flux Ra passes and the power of the optical surface 62b in the position through which the light flux Rb passes becomes large, which is not preferred because a difference in imaging performance between the two light fluxes becomes large.

Thus, in this embodiment, an origin Q of the 3rd-order non-circular shape is included in a width between the two light fluxes Ra and Rb along the sub-scanning direction. With this configuration, it is possible to reduce the difference in the imaging performance between the two light fluxes. In other words, an origin of a polynomial expression that defines a shape of the optical surface 62b within the sub-scanning section always exists within an area of the optical surface 62b through which the light flux passes (irrespective of the position along the main scanning direction).

The positions through which the light fluxes Ra and Rb pass can be controlled by the arrangement of the first aperture stop 41, which defines the light flux width along the sub-scanning direction, of the two aperture stops included in the incident optical system LA. In this embodiment, the first aperture stop 41 is arranged in the vicinity of the cylindrical lens 30, to thereby reduce the amount by which the two light fluxes Ra and Rb are spaced apart compared to a case where the first aperture stop 41 and the second aperture stop 42 are provided integrally.

Further, in this embodiment, the optical surface including the 3rd-order non-circular shape is set to the optical surface 62b through which the light flux having the largest width along the sub-scanning direction passes. This aims to allow a power change due to the 3rd-order non-circular shape to be used efficiently and to thereby allow an effect of reducing the varying amount of the interval between the scanning lines to be obtained with ease.

As in this embodiment, when the optical surface of the imaging lens includes the sagittal shape having a 3rd-order non-circular shape, there is an asymmetric power change along the sub-scanning direction, which causes a wavefront aberration along the sub-scanning direction to deteriorate and exerts an adverse effect on the imaging performance. When the wavefront aberration along the sub-scanning direction deteriorates, a spot diameter along the sub-scanning direction of the light flux condensed onto the scanned surface 70 is undesirably enlarged. In this case, the spot diameter is defined as a width obtained when a line spread function (LSF) is evaluated with $1/e^2$ of a peak light amount thereof.

In an arbitrary position in the optical surface 62b along the main scanning direction, the wavefront aberration amount in a coordinate Z along the sub-scanning direction is set as W(Z) [λ]. Then, if the values of Z at light flux end portions along the sub-scanning direction are set as Zmax and Zmin, the varying amount $W_{var}$ [λ] of the wavefront aberration amount along the sub-scanning direction is defined as Expression (5).

$$W_{var} = \left| \frac{W(Zmax) - W(Zmin)}{2} \right| \quad (5)$$

Figure 10:
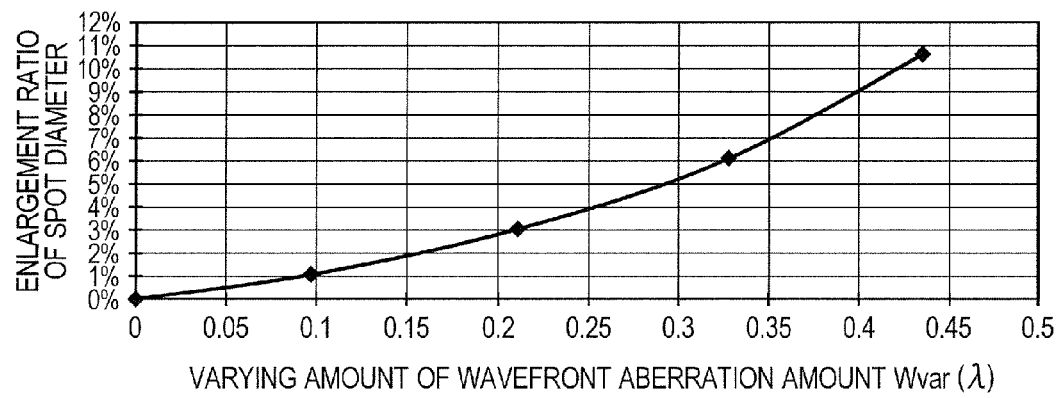
FIG. 10 is a graph for showing a relationship between a varying amount $W_{var}$ of a wavefront aberration amount along the sub-scanning direction and an enlargement ratio of a spot diameter.

FIG. 10 is a graph for showing a relationship between the varying amount $W_{var}$ of the wavefront aberration amount along the sub-scanning direction and an enlargement ratio of the spot diameter. As understood from FIG. 10, when the wavefront aberration deteriorates, the spot diameter is enlarged. In this case, the enlargement ratio of the spot diameter is defined as an enlargement ratio to a desired spot diameter (in this embodiment, 70 μm).

In order to maintain satisfactory printing performance, it is desired that the enlargement ratio of the spot diameter be equal to or smaller than 5% with respect to the desired spot diameter. In other words, assuming that the desired spot diameter of each light flux along the sub-scanning direction is S and that the maximum spot diameter within an effective scanning range is $S_{max}$, it is desired to satisfy a relationship of Expression (6).

$$1.0 \le \frac{S_{max}}{S} \le 1.05 \quad (6)$$

The satisfactory printing performance can be maintained by setting the enlargement ratio of the spot diameter so as to satisfy the relationship of Expression (6). In this embodiment, S is 70 μm, and Sm is 72.1 μm. Thus, the enlargement ratio is obtained as 3%.

Therefore, in this embodiment, the enlargement ratio of the spot diameter can be set to equal to or smaller than 5%, and hence the satisfactory printing performance can be maintained.

Further, in other words, with reference to FIG. 10, the varying amount $W_{var}$ of the wavefront aberration amount along the sub-scanning direction corresponding to the enlargement ratio of the spot diameter 5% is 0.3λ, and hence the satisfactory printing performance can be maintained by satisfying Expression (7).

$$\left| \frac{W(Zmax) - W(Zmin)}{2} \right| \le 0.3 \quad (7)$$

In this embodiment, the enlargement ratio is 3%, and hence $W_{var}$=0.21λ, which can suppress the deterioration of the printing performance.

As described above, the shape within the sub-scanning section of an optical surface of at least one imaging lens included in the imaging optical system has a non-circular shape including at least one order of odd-numbered orders equal to or higher than the 3rd order, and the non-circular shape is changed asymmetrically along the main scanning direction. Thus, it is possible to reduce the varying amount of the interval between the scanning lines due to the assembly error, the manufacturing error, or the like. Therefore, it is possible to reduce the deterioration of the printing performance.

Note that, the embodiment of the present invention is not limited to the above-mentioned configuration. For example, the imaging optical system may be formed of one lens. Further, the angle by which the optical axis of the incident optical system is inclined relative to the main scanning section may be other than 3°, and the same effect can be obtained with the perpendicularly-incident optical system in which the angle is set to, for example, 0°. In addition, the same effect can be obtained even in a case where the number of light-emitting parts is increased to 4 or 8 instead of 2, and various changes can be made thereto appropriately.

Figure 11:
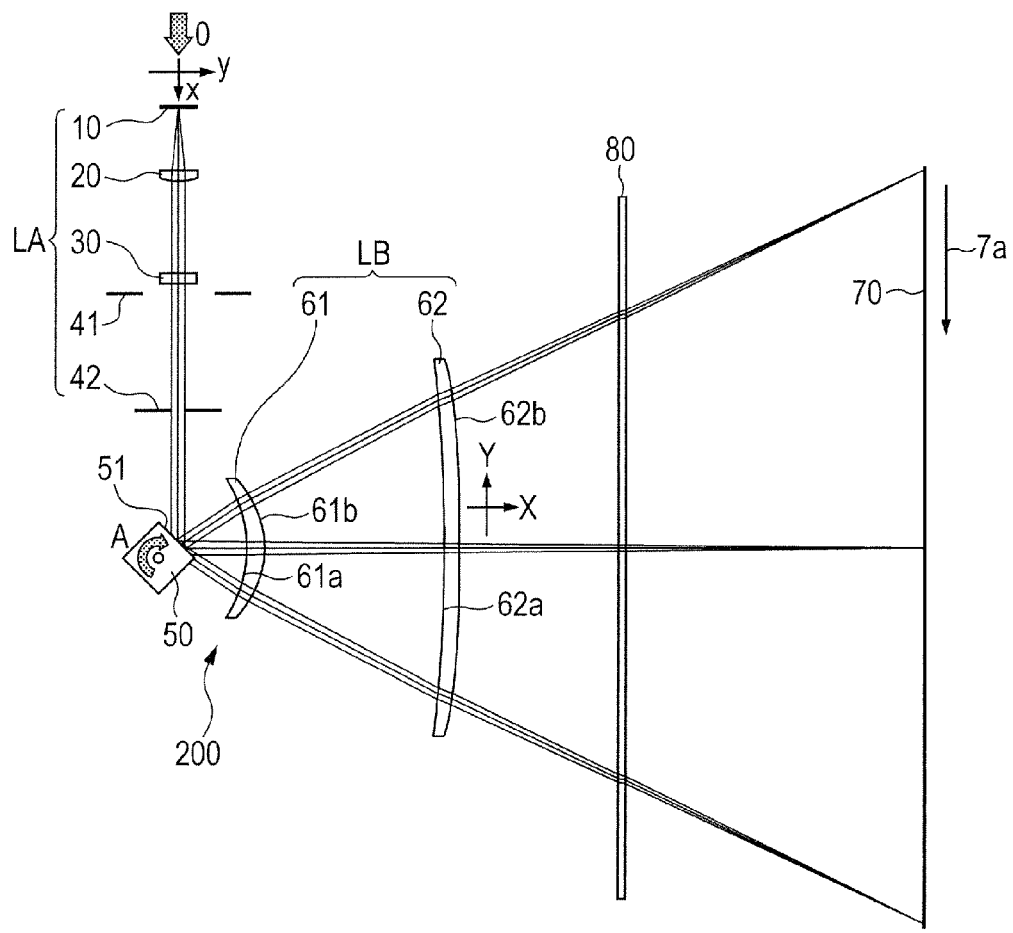
FIG. 11 is a main scanning sectional diagram of an optical scanning apparatus according to a second embodiment of the present invention.
Figure 12:
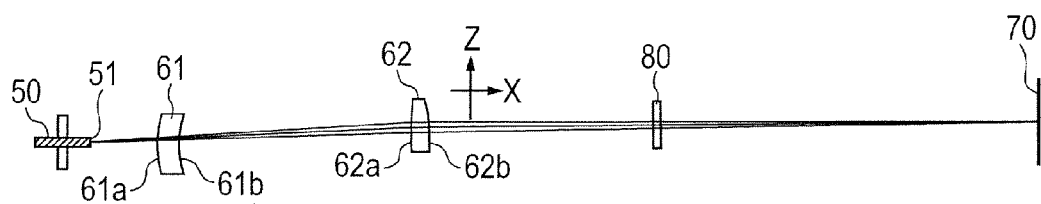
FIG. 12 is a sub-scanning sectional diagram of an imaging optical system of the optical scanning apparatus.
Figure 13:
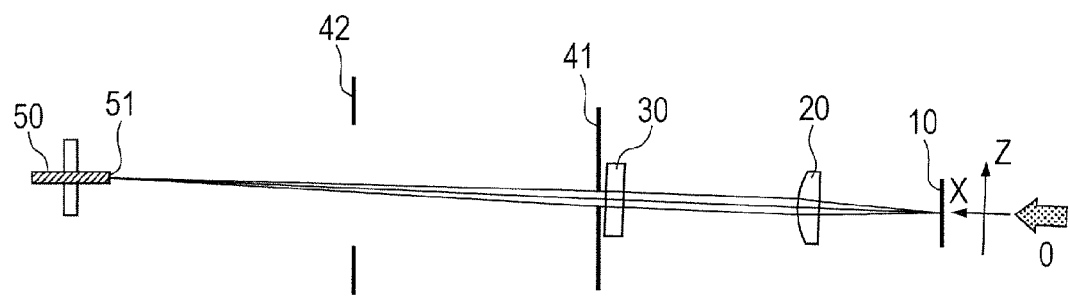
FIG. 13 is a sub-scanning sectional diagram of an incident optical system of the optical scanning apparatus.

FIG. 11 is a main scanning sectional diagram of an optical scanning apparatus 200 according to a second embodiment of the present invention. FIG. 12 is a sub-scanning sectional diagram of an imaging optical system LB of the optical scanning apparatus 200. FIG. 13 is a sub-scanning sectional diagram of an incident optical system LA of the optical scanning apparatus 200. Note that, the same components as those of the first embodiment are denoted by the same reference symbols. Further, in the same manner as in the first embodiment, the optical axis of the incident optical system LA is inclined by 3° relative to the main scanning section.

Figure 14A:
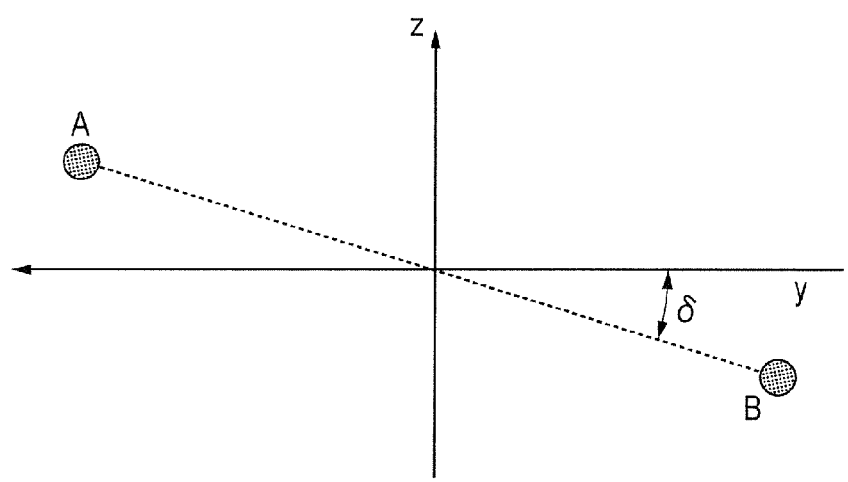
FIG. 14A is a diagram for illustrating an arrangement of two light-emitting parts A and B when viewed from a light source side.
Figure 14B:
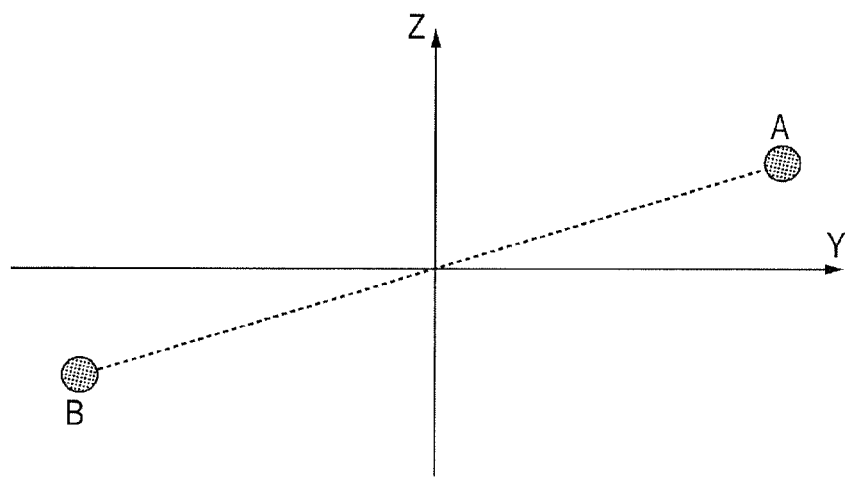
FIG. 14B is a diagram for illustrating positions in which light fluxes emitted from the two light-emitting parts A and B are imaged on a scanned surface.

FIG. 14A is a diagram for illustrating the arrangement of the two light-emitting parts A and B when viewed from the light source 10 side. FIG. 14B is a diagram for illustrating the position in which the light fluxes emitted from the two light-emitting parts A and B are imaged on the scanned surface 70.

As illustrated in FIG. 14A, the two light-emitting parts A and B of the light source 10 of the optical scanning apparatus 200 according to this embodiment are spaced apart by 90 μm. Therefore, if the two light-emitting parts A and B are arrayed along the sub-scanning direction, the interval (pitch) between the scanning lines along the sub-scanning direction on the scanned surface 70 becomes far larger than a desired interval defined based on the record density. Therefore, in the same manner as in the first embodiment, the inclination angle δ is adjusted to 3.92° so that the interval between the scanning lines along the sub-scanning direction on the scanned surface 70 becomes the interval of 42.33 μm between the scanning lines at a time of a desired resolution of 600 dpi. Therefore, the two light-emitting parts A and B are also spaced apart in the main scanning direction.

Then, in the same manner as in the first embodiment, the image data is sent by shifting a timing by a predetermined time period δT so as to adjust the position in which the light flux Ra emitted from the light-emitting part A, which scans succeedingly, is condensed to the position in which the light flux Rb emitted from the light-emitting part B, which scans precedingly along the main scanning direction, is condensed onto the scanned surface 70.

As illustrated in FIG. 14A, this embodiment is different from the first embodiment in the arrangement of the two light-emitting parts A and B, and the other configuration thereof is the same as that of the first embodiment.

Table 2 is for showing various characteristics of the respective optical systems of the optical scanning apparatus 200 according to the second embodiment.

TABLE 2

| Configuration of incident optical system/imaging optical system | | | | Data on optical surface of imaging optical system | | | | |
|---|---|---|---|---|---|---|---|---|
| | | | | First imaging lens | | Second imaging lens | | |
| | | | | 61a surface | 61b surface | 62a surface | 62b surface | |
| Wavelength of light source 10 | λ (nm) | 790 | | R | −3.52242E+01 | −2.60825E+01 | −5.00000E+02 | 4.52756E+03 |
| Number of light-emitting parts | n | 2 | | K | 4.00206E−01 | −4.98269E−01 | 0.00000E+00 | 2.47351E+01 |
| Thickness of laser cover glass | deg (mm) | 0.25000 | Meridional line | B2 | 0.00000E+00 | 0.00000E+00 | 0.00000E+00 | 0.00000E+00 |
| Refractive index of laser cover glass | n0 | 1.51052 | | B4 | −7.94385E−07 | −1.67241E−06 | 0.00000E+00 | −8.18332E−07 |
| Distance between light-emitting part and first surface of collimator lens 20 | d0 (mm) | 18.30500 | | B6 | 4.77804E−08 | 1.79489E−08 | 0.00000E+00 | 2.03331E−10 |
| Curvature radius of first surface of collimator lens 20 | R1 (mm) | ∞ | | B8 | −1.88017E−10 | −3.80662E−11 | 0.00000E+00 | −4.63275E−14 |
| | | | | B10 | 2.16460E−13 | −1.42499E−14 | 0.00000E+00 | 5.04782E−18 |
| Curvature radius of second surface of collimator lens 20 | R2 (mm) | −15.21639 | | B12 | 0.00000E+00 | 0.00000E+00 | 0.00000E+00 | 0.00000E+00 |
| Thickness of collimator lens 20 | d1 (mm) | 3.00000 | Sagittal line | r | 2.50000E+01 | 2.50000E+01 | 6.72041E+01 | −3.93184E+01 |
| Refractive index of collimator lens 20 | n1 | 1.76167 | | | | | | |
| Distance between second surface of collimator lens 20 and first surface of cylindrical lens 30 | d2 (mm) | 27.17500 | | k | 0.00000E+00 | 0.00000E+00 | 0.00000E+00 | 0.00000E+00 |
| Curvature radius of first surface of cylindrical lens 30 along sub-scanning direction | Rs3 (mm) | 41.03107 | | D2u | 0.00000E+00 | −3.18148E−04 | 0.00000E+00 | 1.68550E−04 |
| Curvature radius of first surface of cylindrical lens 30 along main scanning direction | Rm3 (mm) | ∞ | | D4u | 0.00000E+00 | −2.09291E−06 | 0.00000E+00 | −9.96398E−09 |
| Curvature radius of second surface of cylindrical lens 30 along sub-scanning direction | Rs4 (mm) | ∞ | | D6u | 0.00000E+00 | 9.88514E−09 | 0.00000E+00 | −3.28608E−11 |
| | | | | D8u | 0.00000E+00 | −1.79866E−11 | 0.00000E+00 | 2.17776E−14 |
| Curvature radius of second surface of cylindrical lens 30 along main scanning direction | Rm4 (mm) | ∞ | | D10u | 0.00000E+00 | 4.94033E−14 | 0.00000E+00 | −4.55015E−18 |
| Thickness of cylindrical lens 30 | d3 (mm) | 3.00000 | | D12u | 0.00000E+00 | −2.31615E−16 | 0.00000E+00 | 0.00000E+00 |
| Refractive index of cylindrical lens 30 | n2 | 1.52397 | | D14u | 0.00000E+00 | 6.36284E−19 | 0.00000E+00 | 0.00000E+00 |
| Distance between second surface of cylindrical lens 30 and first aperture stop 41 | d4 (mm) | 3.15700 | | | | | | |
| Distance between first aperture stop 41 and second aperture stop 42 | d5 (mm) | 33.94350 | | D21 | 0.00000E+00 | −6.60858E−04 | 0.00000E+00 | 2.31614E−04 |
| Distance between second aperture stop 42 and deflecting/reflecting surface 51 | d6 (mm) | 39.74450 | | | | | | |
| Distance between deflecting/reflecting surface 51 on axis and optical surface 61a | d7 (mm) | 20.00000 | | D41 | 0.00000E+00 | −7.65312E−07 | 0.00000E+00 | −7.12543E−08 |
| Thickness of first imaging lens 61 | d8 (mm) | 5.00000 | | | | | | |

TABLE 2-continued

| Configuration of incident optical system/imaging optical system | | | Data on optical surface of imaging optical system | | | | |
|---|---|---|---|---|---|---|---|
| | | | First imaging lens | | Second imaging lens | | |
| | | | 61a surface | 61b surface | 62a surface | 62b surface | |
| Wavelength of light source 10 | λ (nm) | 790 | | | | | |
| Number of light-emitting parts | | 2 | | | | | |
| Refractive index of first imaging lens 61 | n3 | 1.52397 | D61 | 0.00000E+00 | -8.73464E-11 | 0.00000E+00 | 5.67682E-11 |
| Distance between optical surface 61b and optical surface 62a | d9 (mm) | 51.50000 | D81 | 0.00000E+00 | 3.86522E-11 | 0.00000E+00 | -2.69336E-14 |
| Thickness of second imaging lens 62 | d10 (mm) | 4.00000 | D101 | 0.00000E+00 | -5.02473E-14 | 0.00000E+00 | 5.08418E-18 |
| Refractive index of second imaging lens 62 | n4 | 1.52397 | D121 | 0.00000E+00 | -8.42653E-16 | 0.00000E+00 | 0.00000E+00 |
| Distance between optical surface 62b and first surface of dustproof glass 80 | d11 (mm) | 49.62080 | D141 | 0.00000E+00 | 2.81742E-18 | 0.00000E+00 | 0.00000E+00 |
| Thickness of dustproof glass 80 | d12 (mm) | 1.80000 | G0, 1 | | | -3.74303E-03 | -8.20000E-02 |
| Refractive index of dustproof glass 80 | n5 | 1.51052 | G1, 1 | | | -3.70279E-04 | -3.61700E-04 |
| Distance between second surface of dustproof glass 80 and scanned surface 70 | d13 (mm) | 83.28920 | G2, 1 | | | 4.08630E-06 | 1.43906E-05 |
| Incident angle in main scanning direction of deflection unit 50 of incident optical system LA | α (deg) | 90.00000 | G3, 1 | | | 2.41952E-07 | 2.49572E-07 |
| Incident angle in sub-scanning direction of deflection unit 50 of incident optical system LA | β (deg) | 3.00000 | G4, 1 | | | -9.64388E-10 | -6.58172E-09 |
| Effective scanning angle | γ (deg) | ±33.7034 | G5, 1 | | | -1.07296E-09 | -9.35450E-10 |
| Number of surfaces of deflection unit 50 | | 4 | G6, 1 | | | 6.96837E-12 | 8.43076E-12 |
| Circumradius of deflection unit 50 | Rpol (mm) | 10.00000 | G7, 1 | | | 1.17625E-12 | 9.38275E-13 |
| Center position of deflection unit 50 (in optical axis direction of imaging optical system LB) | PX (mm) | -5.57870 | G8, 1 | | | -8.00827E-15 | -6.91500E-15 |
| Center position of deflection unit 50 (in deflection scanning direction) | PY (mm) | -4.57630 | G9, 1 | | | -6.34532E-16 | -4.67583E-16 |
| Aperture stop diameter ((second aperture stop) × (first aperture stop)) | Rectangle (mm) | 3.60 × 2.08 | G10, 1 | | | 3.03992E-18 | 2.32157E-18 |
| | | | G11, 1 | | | 1.50062E-19 | 1.01048E-19 |
| | | | G12, 1 | | | -5.01662E-22 | -3.65370E-22 |
| | | | G13, 1 | | | -1.18408E-23 | -7.24272E-24 |
| | | | G0, 3 | | | | 0.00000E+00 |
| | | | G1, 3 | | | | 6.09598E-06 |
| | | | G2, 3 | | | | 5.22760E-08 |
| | | | G3, 3 | | | | -1.35705E-09 |
| | | | G4, 3 | | | | -2.24533E-11 |

*Refractive index is refractive index relative to wavelength of 790 nm

In Table 2, "E±x" represents "$10^{\pm x}$". Further, every coefficient is 0 unless otherwise specified.

The meridional shape and the sagittal shape of each of the optical surfaces 61a, 61b, 62a, and 62b of the first imaging lens 61 and the second imaging lens 62, which form the imaging optical system LB, is expressed by Expressions (1), (2), and (3), which are the same as in the first embodiment. This embodiment is the same as the first embodiment in the meridional shape, but is different therefrom in the sagittal shape.

Figure 15:
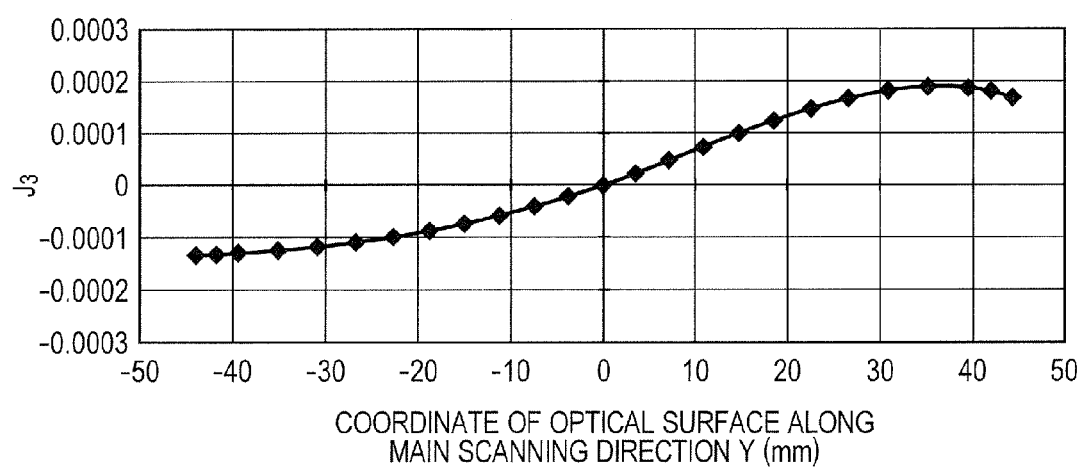
FIG. 15 is a graph for showing a change of $J_3$ with respect to a coordinate Y of an optical surface along the main scanning direction in the optical scanning apparatus according to the second embodiment.

FIG. 15 is a graph for showing a change in $J_3$ with respect to the coordinate Y of the optical surface along the main scanning direction in the optical scanning apparatus 200 according to this embodiment. In the optical scanning apparatus 200 according to this embodiment, the sign of $J_3$ is positive at the effective range end portion (upper side of FIG. 11 and positive side of FIG. 15) on the light source side of the optical surface 62b. On the other hand, the sign of $J_3$ is negative at the effective range end portion (lower side of FIG. 11 and negative side of FIG. 15) on the anti-light source side. Thus, the sign of the light source side end portion is set to be opposite to that of the anti-light source side end portion, and the signs of $J_3$ at the respective end portions are opposite to the signs of $J_3$ of the first embodiment.

Figure 16A:
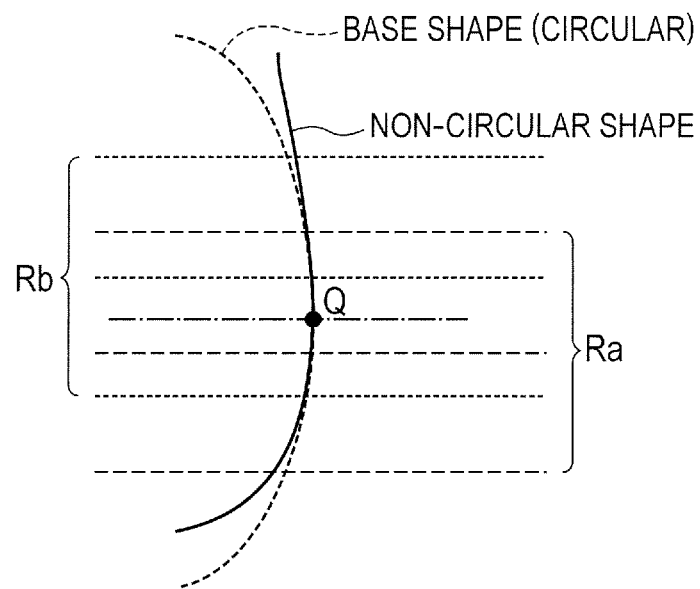
FIG. 16A is a sub-scanning sectional diagram of an optical surface of a second imaging lens at a light source side end portion thereof.
Figure 16B:
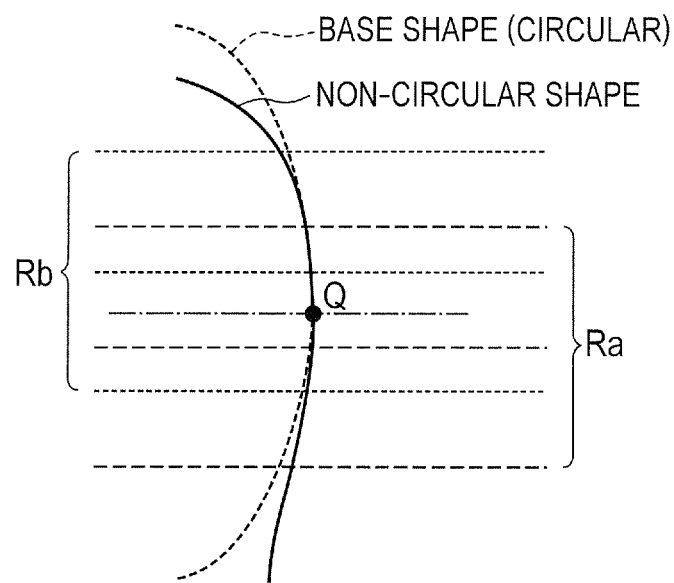
FIG. 16B is a sub-scanning sectional diagram of the optical surface of the second imaging lens at an anti-light source side end portion thereof.
Figure 17A:
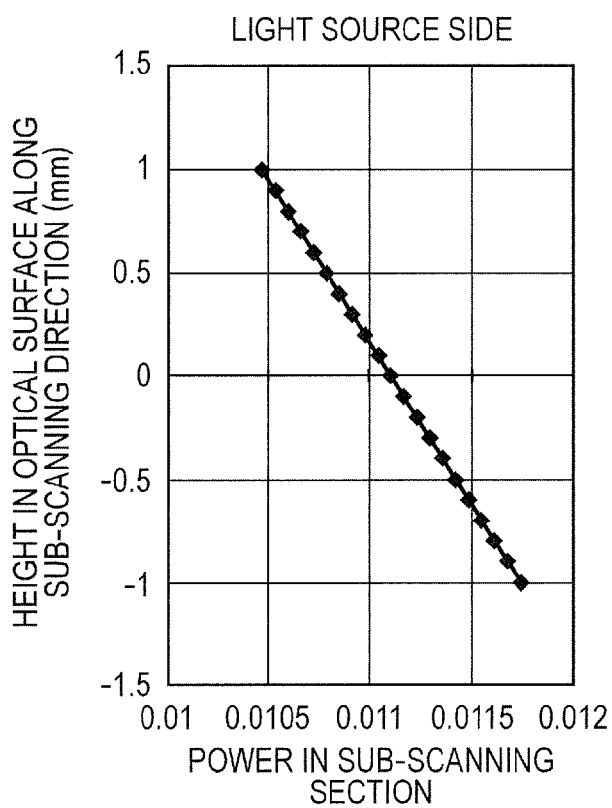
FIG. 17A is a graph for showing a relationship between a height in the optical surface along the sub-scanning direction and a power in a sub-scanning section at the light source side end portion of the optical surface of the second imaging lens.
Figure 17B:
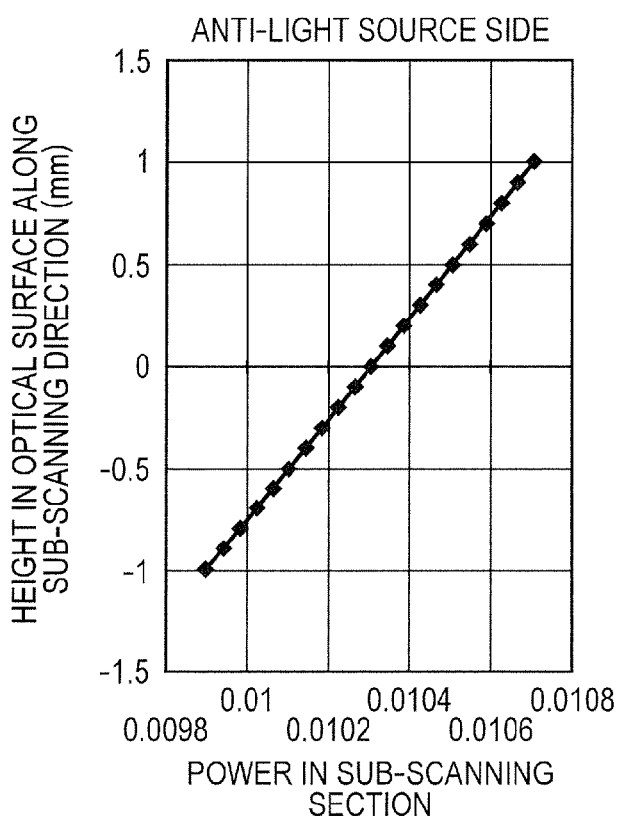
FIG. 17B is a graph for showing a relationship between a height in the optical surface along the sub-scanning direction and a power in the sub-scanning section at the anti-light source side end portion of the optical surface of the second imaging lens.

FIG. 16A is a sub-scanning sectional diagram of the optical surface 62b of the second imaging lens 62 at the light source side end portion. FIG. 16B is a sub-scanning sectional diagram thereof at the anti-light source side end portion. In FIGS. 16A and 16B, for the sake of clarity in description, the 1st-order term (tilt component) of the sagittal line is removed. Note that, the light fluxes Ra and Rb emitted from the two light-emitting parts A and B each pass through a position deviating relatively in the sub-scanning direction in the optical surface 62b of the second imaging lens 62. FIG. 17A is a graph for showing a relationship between the height in the optical surface along the sub-scanning direction and the power in the sub-scanning section at the light source side end portion of the optical surface 62b of the second imaging lens 62. FIG. 17B is a graph for showing a relationship between the height in the optical surface along the sub-scanning direction and the power in the sub-scanning section at the anti-light source side end portion of the optical surface 62b of the second imaging lens 62.

As shown in FIG. 17A, at the light source side end portion at which the sign of $J_3$ is positive, in the upper portion of the optical surface 62b in the sub-scanning direction, the power is weaker than that of the base circular shape due to the sagittal shape having the 3rd-order non-circular shape, while the power is stronger in the lower portion of the sub-scanning direction. On the other hand, at the anti-light source side end portion at which the sign of $J_3$ is negative, the power is stronger in the upper portion of the sub-scanning direction, while the power is weaker in the lower portion of the sub-scanning direction.

Next, consideration is given to a case where the second imaging lens 62 shifts upward in the sub-scanning direction due to an assembly error. In this case, the position through which the light flux passes shifts relatively toward the lower side in the sub-scanning direction.

On the light source side, as shown in FIG. 17A, the power of the optical surface 62b of the second imaging lens 62 becomes stronger as the height becomes lower along the sub-scanning direction. Thus, the wavefront is advanced compared to a time before the second imaging lens 62 shifts.

Further, in contrast to the first embodiment, the light flux Ra passes through the optical surface 62b of the second imaging lens 62 in the lower position in the sub-scanning direction than the light flux Rb. Then, as illustrated in FIG. 14B, when the light fluxes are deflected by the same deflecting surface 51 at the same timing, the light flux Ra is imaged on the scanned surface 70 in the upper position along the sub-scanning direction than the imaging position of the light flux Rb contrary to the case in the optical surface 62b.

Therefore, the wavefront is advanced to cause the imaging position of the light flux Ra to deviate toward the upper side than in the case where the sagittal shape does not have the 3rd-order non-circular shape.

On the other hand, the light flux Rb is imaged on the scanned surface 70 in the lower position than the imaging position of the light flux Ra, and hence the wavefront is advanced to cause the imaging position of the light flux Rb to deviate toward the lower side than in the case where the sagittal shape does not have the 3rd-order non-circular shape.

Therefore, in this embodiment, at the light source side end portion, the interval along the sub-scanning direction between the imaging positions of the light fluxes Ra and Rb on the scanned surface 70 becomes larger than in the case where the sagittal shape does not have the 3rd-order non-circular shape.

Next, on the anti-light source side, as shown in FIG. 17B, the power of the optical surface 62b of the second imaging lens 62 becomes weaker as the height becomes lower along the sub-scanning direction. Thus, the wavefront is delayed compared to the time before the second imaging lens 62 shifts.

Therefore, the wavefront is delayed to cause the imaging position of the light flux Ra to deviate toward the lower side than in the case where the sagittal shape does not have the 3rd-order non-circular shape.

On the other hand, the imaging position of the light flux Rb deviates toward the upper side than in the case where the sagittal shape does not have the 3rd-order non-circular shape.

Therefore, at the anti-light source side end portion, the interval along the sub-scanning direction between the imaging positions of the light fluxes Ra and Rb on the scanned surface 70 becomes smaller than in the case where the sagittal shape does not have the 3rd-order non-circular shape.

Figure 18:
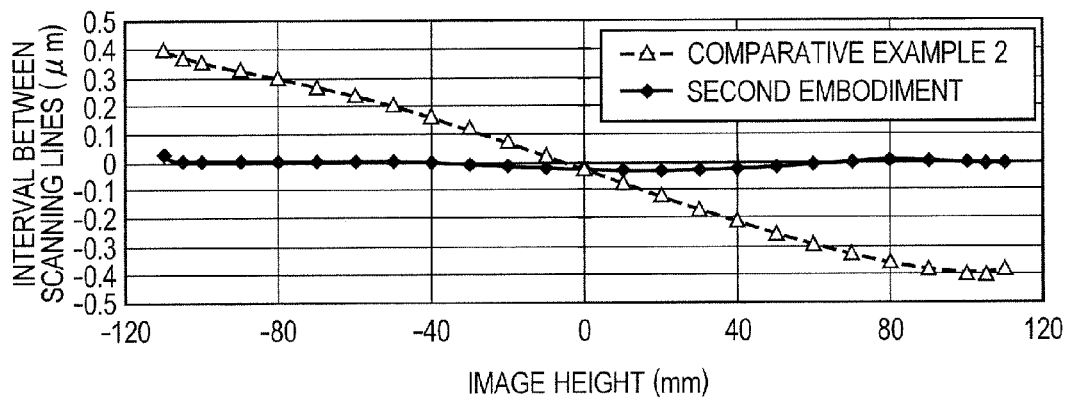
FIG. 18 is a graph for showing an interval between scanning lines of light fluxes Ra and Rb with each image height on the scanned surface, which is obtained when the second imaging lens shifts upward in the sub-scanning direction by 0.1 mm in the optical scanning apparatus according to the second embodiment.

FIG. 18 is a graph for showing the interval between the scanning lines of the light fluxes Ra and Rb with each image height on the scanned surface 70, which is obtained when the second imaging lens 62 shifts upward in the sub-scanning direction by 0.1 mm in the optical scanning apparatus 200 according to this embodiment. Note that, in FIG. 18, the interval between the scanning lines is shown as a deviation from 42.33 μm that is the ideal interval between the scanning lines. Further, in FIG. 18, Comparative Example 2 in which the sagittal shape of the optical surface 62b of the second imaging lens 62 does not have the 3rd-order non-circular shape is also shown for the sake of comparison. Note that, Comparative Example 2 is different from Comparative Example 1 in the arrangement of the light-emitting parts, and employs the arrangement of the second embodiment (FIG. 14A).

As shown in FIG. 18, it is understood that the varying amount of the interval between the scanning lines of the light fluxes Ra and Rb can be reduced by employing this embodiment. In Comparative Example 2 that does not employ this embodiment, the imaging lens does not include the optical surface in which the sagittal shape has the 3rd-order non-circular shape, and hence the varying amount of the interval between the scanning lines differs depending on the image height. In addition, the sign is different between in the light source side end portion and in the anti-light source side end portion. The sign of the varying amount of the interval between the scanning lines according to Comparative Example 2 at the light source side end portion and at the anti-light source side end portion are opposite to those of Comparative Example 1 because the light-emitting parts A and B are reversed in the sub-scanning direction compared to Comparative Example 1. Thus, in the optical surface 62b of the second imaging lens 62 of the optical scanning apparatus 200 according to this embodiment, $J_3$ is changed asymmetrically in the main scanning direction, and the sign is reversed between the light source side end portion and the anti-light source side end portion. Accordingly, the varying amount of the interval between the scanning lines of the light fluxes Ra and Rb can be reduced.

The inclination direction of the change in $J_3$ of the optical surface 62b according to the second embodiment is opposite to the inclination direction of the change in $J_3$ of the optical surface 62b according to the first embodiment, but has the same relationship with the inclination direction between the imaging positions of the light fluxes emitted from the two light-emitting parts A and B on the scanned surface 70.

That is, when the same coordinate axes X, Y, and Z are defined for the optical surface 62b and the scanned surface 70, the inclination direction of the change in $J_3$ of the optical surface 62b according to the second embodiment is set to have the same sign as the inclination direction between the imaging positions in which the light fluxes emitted from the two light-emitting parts A and B deflected by the deflecting surface 51 at the same timing are imaged on the scanned surface 70. In other words, the positive-negative relationship of the inclination of the change in $J_3$ of the optical surface 62b according to the second embodiment (FIG. 15) is set to have the same sign as the positive-negative relationship of the inclination between the imaging positions in which the light fluxes emitted from the two light-emitting parts A and B at the same timing are imaged on the scanned surface 70 (FIG. 14B). By thus changing $J_3$ of the optical surface 62b, it is possible to reduce the varying amount of the interval between the scanning lines.

Note that, in this embodiment, the varying amount of the wavefront aberration amount along the sub-scanning direction is 0.22λ, and in the same manner as in the first embodiment, the enlargement ratio of the spot diameter is suppressed to 3%, which can suppress the deterioration of the printing performance.

As described above, the shape within the sub-scanning section of the optical surface of at least one imaging lens included in the imaging optical system has the non-circular shape including at least one order of odd-numbered orders equal to or higher than the 3rd order, and the non-circular shape is changed asymmetrically along the main scanning direction. Thus, it is possible to reduce the varying amount of the interval between the scanning lines due to the assembly error, the manufacturing error, or the like. Therefore, it is possible to reduce the deterioration of the printing performance.

Note that, the second embodiment is not limited thereto, and in the same manner as in the first embodiment, various changes can be made thereto appropriately.

Figure 19:
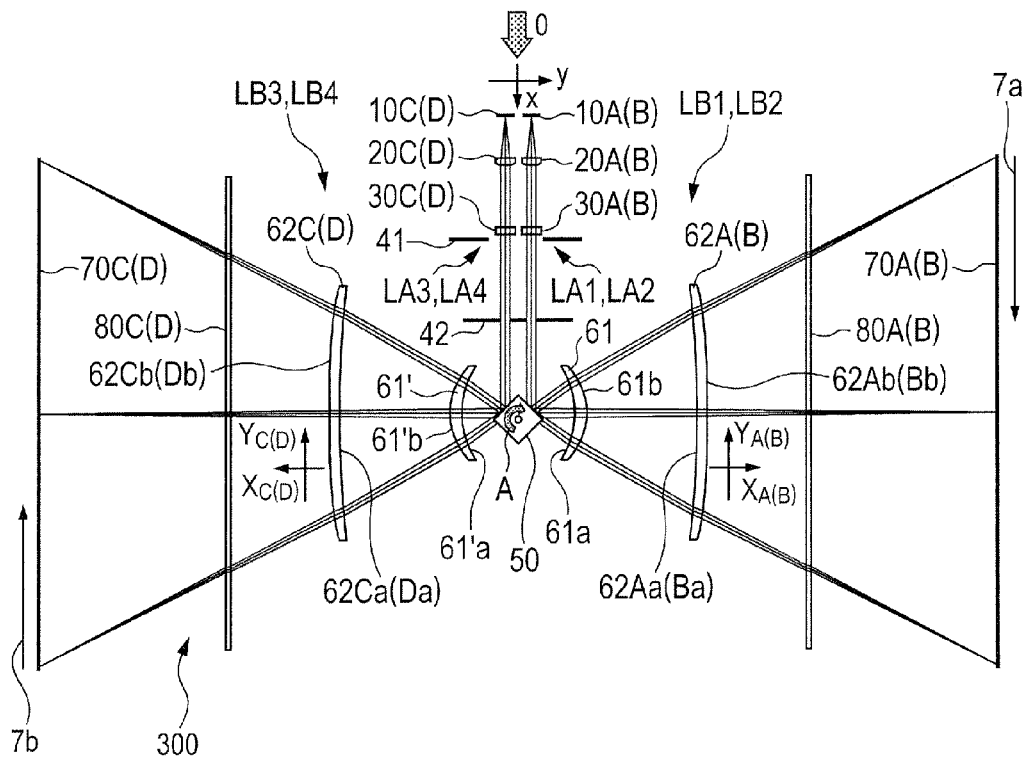
FIG. 19 is a main scanning sectional diagram of an optical scanning apparatus according to a third embodiment of the present invention.
Figure 20:
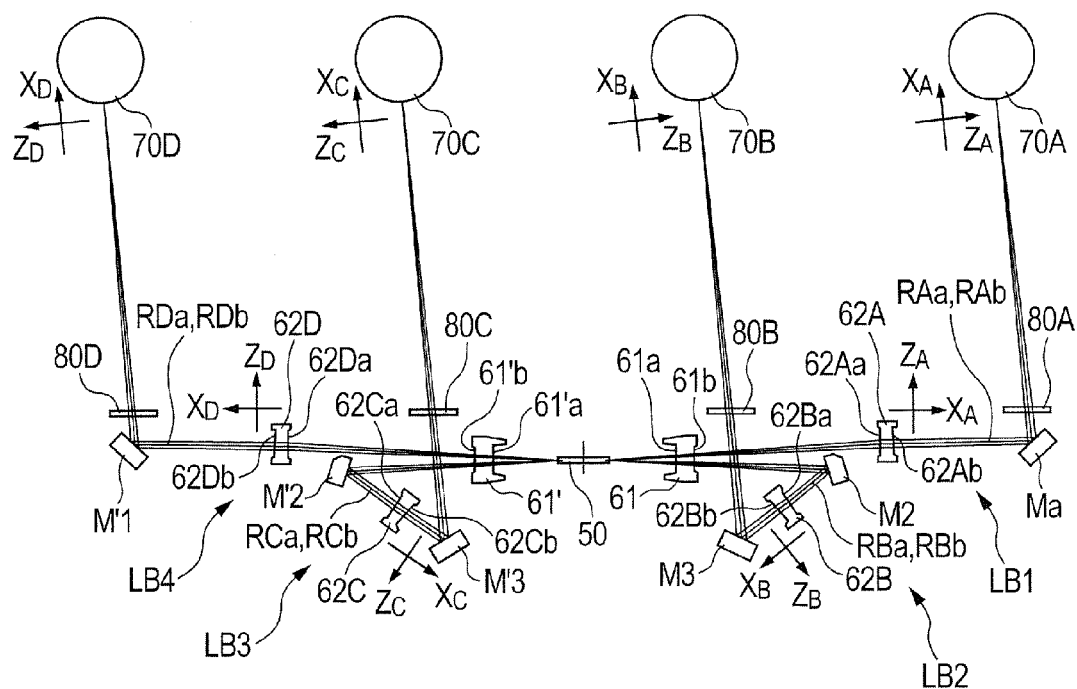
FIG. 20 is a sub-scanning sectional diagram of an imaging optical system of the optical scanning apparatus.
Figure 21:
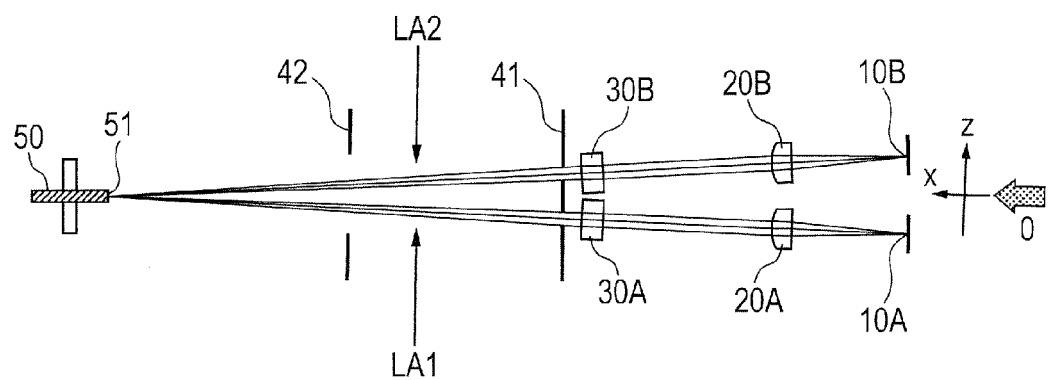
FIG. 21 is a sub-scanning sectional diagram of an incident optical system of the optical scanning apparatus.

FIG. 19 is a main scanning sectional diagram of an optical scanning apparatus 300 according to a third embodiment of the present invention. FIG. 20 is a sub-scanning sectional diagram of imaging optical systems LB1, LB2, LB3, and LB4 of the optical scanning apparatus 300. FIG. 21 is a sub-scanning sectional diagram of incident optical systems LA1 and LA2 of the optical scanning apparatus 300. Note that, folding mirrors M1, M2, M3, M'1, M'2, and M'3 are not illustrated in FIG. 19.

The optical scanning apparatus 300 includes light sources 10A, 10B, 10C, and 10D, collimator lenses 20A, 20B, 20C, and 20D, cylindrical lenses 30A, 30B, 30C, and 30D, the first aperture stop 41, and the second aperture stop 42. Further, the optical scanning apparatus 300 includes the deflection unit 50, first imaging lenses 61 and 61', and second imaging lenses 62A, 62B, 62C, and 62D. In addition, the optical scanning apparatus 300 includes the folding mirrors M1, M2, M3, M'1, M'2, and M'3 and dustproof glasses 80A, 80B, 80C, and 80D.

In the optical scanning apparatus 300 according to this embodiment, the incident optical system LA1 is formed of the light source 10A, the collimator lens 20A, the cylindrical lens 30A, the first aperture stop 41, and the second aperture stop 42. Further, in the optical scanning apparatus 300 according to this embodiment, the imaging optical system LA2 is formed of the light source 10B, the collimator lens 20B, the cylindrical lens 30B, the first aperture stop 41, and the second aperture stop 42. Further, in the optical scanning apparatus 300 according to this embodiment, the incident optical system LA3 is formed of the light source 10C, the collimator lens 20C, the cylindrical lens 30C, the first aperture stop 41, and the second aperture stop 42. Further, in the optical scanning apparatus 300 according to this embodiment, the incident optical system LA4 is formed of the light source 10D, the collimator lens 20D, the cylindrical lens 30D, the first aperture stop 41, and the second aperture stop 42.

Further, the imaging optical system LB1 is formed of the first imaging lens 61, the second imaging lens 62A, and the folding mirror M1, and the imaging optical system LB2 is formed of the first imaging lens 61, the second imaging lens 62B, and the folding mirrors M2 and M3. Further, the imaging optical system LB3 is formed of the first imaging lens 61', the second imaging lens 62C, and the folding mirrors M'2 and M'3, and the imaging optical system LB4 is formed of the first imaging lens 61', the second imaging lens 62D, and the folding mirror M'1.

As illustrated in FIG. 21, the optical axis of the incident optical system LA1 of the optical scanning apparatus 300 according to this embodiment is inclined by 3° relative to the main scanning section, and the optical axis of the incident optical system LA2 is inclined by 3° relative to the main scanning section. The optical axes of the incident optical system LA and the incident optical system LA2 are set so as to be made incident on the main scanning section from mutually different sides. Further, although not shown, in the same manner, the optical axis of the incident optical system LA3 is inclined by 3° relative to the main scanning section, and the optical axis of the incident optical system LA4 is inclined by 3° relative to the main scanning section. The optical axes of the incident optical system LA3 and the incident optical system LA4 are set so as to be made incident on the main scanning section from mutually different sides. Further, the optical axes of the incident optical system LA1 and the incident optical system LA4 are set so as to be made incident on the main scanning section from the same side, and the optical axes of the incident optical system LA2 and the incident optical system LA3 are set so as to be made incident on the main scanning section from the same side.

Light fluxes RAa and RAb emitted from the light-emitting parts A and B of the light source 10A are deflected by the deflection unit 50 after passing through the incident optical system LA1, and are condensed onto a scanned surface 70A by the imaging optical system LB1. Light fluxes RBa and RBb emitted from the light-emitting parts A and B of the light source 10B are deflected by the deflection unit 50 after passing through the incident optical system LA2, and are condensed onto a scanned surface 70B by the imaging optical system LB2. Light fluxes RCa and RCb emitted from the light-emitting parts A and B of the light source 10C are deflected by the deflection unit 50 after passing through the incident optical system LA3, and are condensed onto the scanned surface 70C by the imaging optical system LB3. Light fluxes RDa and RDb emitted from the light-emitting parts A and B of the light source 10D are deflected by the deflection unit 50 after passing through the incident optical system LA4, and are condensed onto the scanned surface 70D by the imaging optical system LB4.

Figure 22:
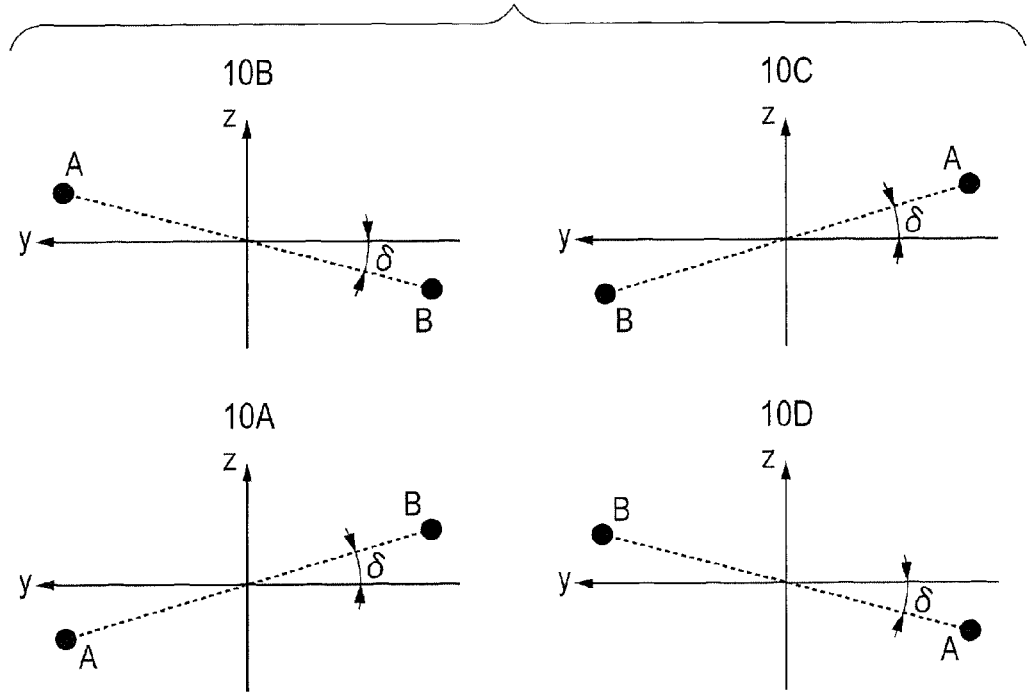
FIG. 22 is a diagram for illustrating arrangements of two light-emitting parts A and B when viewed from a light source side.

FIG. 22 is a diagram for illustrating the arrangement of the two light-emitting parts A and B when viewed from a side of the light sources 10A to 10D.

As illustrated in FIG. 22, the two light-emitting parts A and B of the light sources 10A to 10D of the optical scanning apparatus 300 according to this embodiment are spaced apart from each other by 90 μm. Therefore, if the two light-emitting parts A and B are arrayed along the sub-scanning direction, the intervals (pitch) between the scanning lines along the sub-scanning direction on the scanned surfaces 70A to 70D become far larger than the desired interval defined based on the record density. Therefore, in the same manner as in the first embodiment and the second embodiment, the inclination angle δ is adjusted to 3.92° so that the intervals between the scanning lines along the sub-scanning direction on the scanned surfaces 70A to 70D become the interval of 42.33 μm between the scanning lines at the time of the desired resolution of 600 dpi. Therefore, the two light-emitting parts A and B are also spaced apart in the main scanning direction.

The meridional shape and the sagittal shape of each of the optical surfaces 61a, 61b, 61'a, 61'b, 62Aa, 62Ab, 62Ba, 62Bb, 62Ca, 62Cb, 62Da, and 62Db of the first imaging lenses 61 and 61' and the second imaging lenses 62A to 62D that form the imaging optical systems LB1 to LB4 are expressed by Expressions (1), (2), and (3) in the same manner as in the first embodiment.

The first imaging lens 61' is the same as the first imaging lens 61, and is arranged so as to be reversed in the sub-scanning direction. The shapes of the two lenses are defined by the same coefficients as those of the first embodiment shown in Table 1.

Further, when respective coordinate axes $X_{A(B, C, D)}$, $Y_{A(B, C, D)}$, and $Z_{A(B, C, D)}$ are defined as illustrated in FIG. 19 and FIG. 20, the shapes of the second imaging lenses 62A, 62B, 62C, and 62D are defined by the same coefficients as those of the first embodiment shown in Table 1.

The other configuration is also defined by the same numerical values as those of the first embodiment shown in Table 1.

In the optical scanning apparatus 300 according to this embodiment, the sign of $J_3$ is negative at the effective range end portion (upper side of FIG. 19) on the light source side based on each of the coordinate definitions for the optical surfaces 62Ab, 62Bb, 62Cb, and 62Db of the respective second imaging lenses 62A, 62B, 62C, and 62D. On the other hand, the sign of $J_3$ is positive at the effective range end portion (lower side of FIG. 19) on the anti-light source side. Thus, the sign of the light source side end portion is set to be opposite to that of the anti-light source side end portion. In other words, the change in $J_3$ with respect to a main scanning direction Y is the same as the change according to the first embodiment shown in FIG. 6.

Therefore, when each second imaging lens 62A (62B, 62C, 62D) shifts toward the positive direction of each coordinate system $Z_{A(B, C, D)}$ by 0.1 mm, the interval between the scanning lines of a light flux RA(B, C, D)a and RA(B, C, D)b at each image height on each scanned surface 70A (70B, 70C, 70D) is the same as that shown in FIG. 9.

Figure 23:
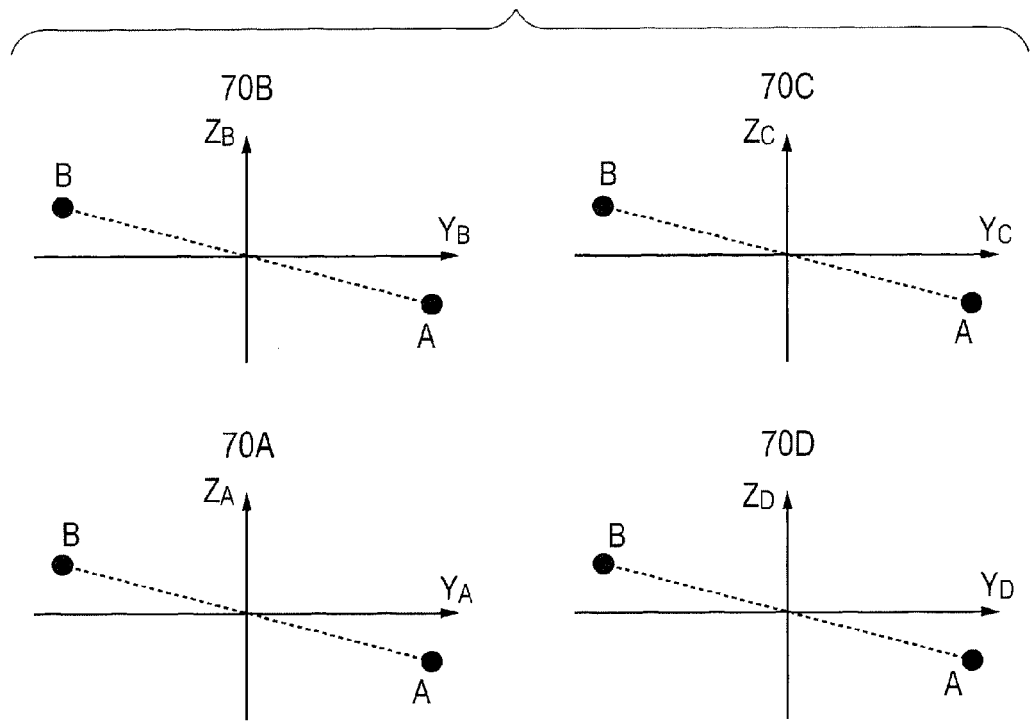
FIG. 23 is a diagram for illustrating positions in which light fluxes emitted from the two light-emitting parts of the light source are imaged on the scanned surfaces.

FIG. 23 is a diagram for illustrating the positions in which the light fluxes emitted from the two light-emitting parts A and B of the light sources 10A, 10B, 10C, and 10D are imaged on the scanned surfaces 70A, 70B, 70C, and 70D.

In this case, as the coordinate axes of the respective scanned surfaces 70A, 70B, 70C, and 70D, the same coordinate axes as those of the corresponding second imaging lenses 62A, 62B, 62C, and 62D are defined. However, the same coordinate axes referred to in this case are the coordinate axes that are the same after the directions of positive and negative of the respective coordinate axes are matched with each other also in consideration of the reversal of the coordinate axes based on the folding mirrors M1, M2, M3, M'1, M'2, and M'3 arranged in the respective optical paths.

In this embodiment, unlike in the first embodiment or the second embodiment, the folding mirrors M1 to M3 and M'1 to M'3 configured to fold the optical path along the sub-scanning direction are arranged in the optical paths between the second imaging lenses 62A to 62D and the scanned surfaces 70A to 70D. Thus, the coordinate axes are reversed due to the folding of the optical paths along the sub-scanning direction before and after the respective folding mirrors M1 to M3 and M'1 to M'3. In FIG. 20, the same coordinate axes are defined for the scanned surfaces 70A to 70D corresponding to the respective second imaging lenses 62A to 62D also in consideration of the reversal.

In this manner, when the same coordinate axes are defined for the scanned surfaces 70A to 70D corresponding to the respective second imaging lenses 62A to 62D also in consideration of the reversal of the coordinate axes due to the folding of the optical paths, the inclination direction, namely, the positive-negative relationship, of the change in $J_3$ of each of the optical surfaces 62Ab, 62Bb, 62Cb, and 62Db is set to have the same sign as the inclination direction, namely, the positive-negative relationship, of the imaging positions in which the light fluxes emitted from the two light-emitting parts A and B of each of the corresponding light sources 10A to 10D are imaged on each of the scanned surfaces 70A to 70D. With this configuration, it is possible to reduce the varying amount of the interval between the scanning lines in the same manner as in the first embodiment and the second embodiment.

Further, the varying amount $W_{var}$ of the wavefront aberration amount along the sub-scanning direction according to this embodiment, which is defined by Expression (5), is 0.21λ in the same manner as in the first embodiment, and the enlargement ratio of the spot diameter is suppressed to 3%, which can suppress the deterioration of the printing performance.

As described above, also in the optical scanning apparatus 300 in which four scanned surfaces 70A, 70B, 70C, and 70D are deflected and scanned by one deflection unit 50, the shape within the sub-scanning section of the optical surface of at least one imaging lens included in the corresponding imaging optical systems LB1, LB2, LB3, and LB4 has the non-circular shape including at least one order of the odd-numbered orders equal to or higher than the 3rd order, and by changing the aspherical surface coefficient asymmetrically along the main scanning direction, it is possible to reduce the varying amount of the interval between the scanning lines due to the assembly error, the manufacturing error, or the like. Therefore, it is possible to suppress the deterioration of the printing performance.

Note that, this embodiment employs the configuration in which four scanned surfaces are scanned by one deflection unit, but a configuration in which two scanned surfaces are scanned by one deflection unit can also produce the same effect.

Further, the number of folding mirrors in each optical path can be changed appropriately. In the case, it suffices that the coordinate axes of the imaging lens, which has the non-circular shape including at least one order of the odd-numbered orders equal to or higher than the 3rd order and which includes the optical surface whose aspherical surface coefficient changes asymmetrically along the main scanning direction, are defined as the same coordinate axes as the coordinate axes of the corresponding scanned surface in accordance with the number of folding mirrors in consideration of the reversal of the coordinate axes, and that the inclination direction of the change in $J_3$ is set to have the same sign as the inclination direction of the imaging positions in which a plurality of light-emitting parts are imaged on the scanned surface.

Further, the third embodiment is not limited thereto, and various changes can be made thereto appropriately.

Figure 24:
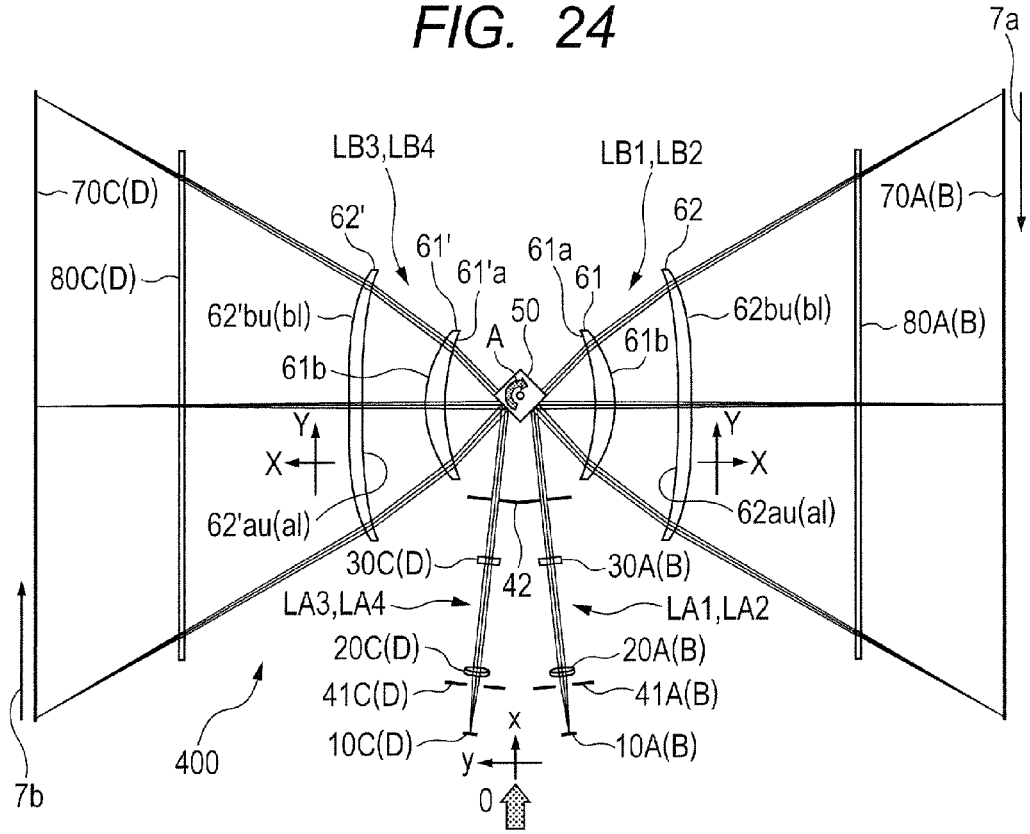
FIG. 24 is a main scanning sectional diagram of an optical scanning apparatus according to a fourth embodiment of the present invention.
Figure 25:
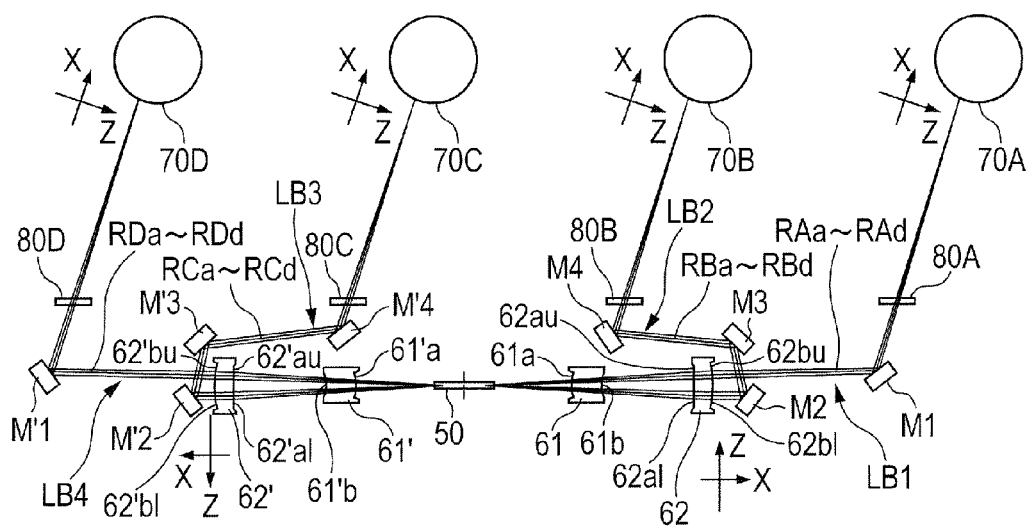
FIG. 25 is a sub-scanning sectional diagram of an imaging optical system of the optical scanning apparatus.
Figure 26:
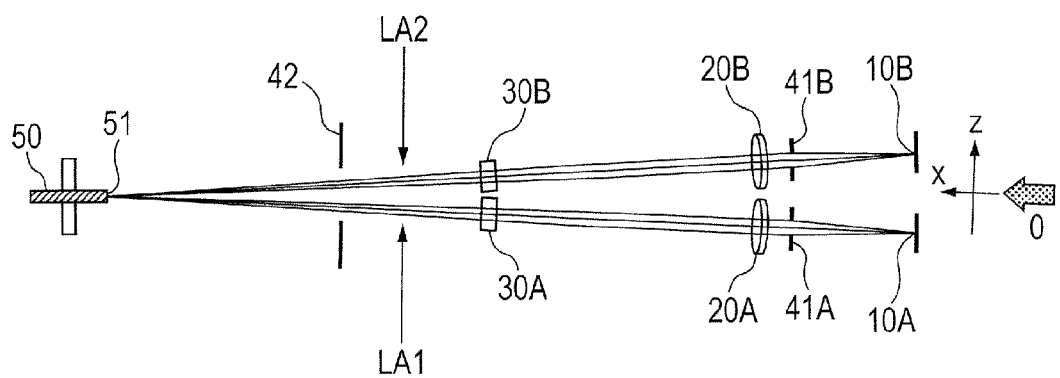
FIG. 26 is a sub-scanning sectional diagram of an incident optical system of the optical scanning apparatus.

FIG. 24 is a main scanning sectional diagram of an optical scanning apparatus 400 according to a fourth embodiment of the present invention. FIG. 25 is a sub-scanning sectional diagram of imaging optical systems LB1, LB2, LB3, and LB4 of the optical scanning apparatus 400. FIG. 26 is a sub-scanning sectional diagram of incident optical systems LA1 and LA2 of the optical scanning apparatus 400. Note that, folding mirrors M1, M2, M3, M4, M'1, M'2, M'3, and M'4 are not illustrated in FIG. 24.

The optical scanning apparatus 400 includes the light sources 10A, 10B, 10C, and 10D, first aperture stops 41A, 41B, 41C, and 41D, the collimator lenses 20A, 20B, 20C, and 20D, the cylindrical lenses 30A, 30B, 30C, and 30D, and the second aperture stop 42. Further, the optical scanning apparatus 400 includes the deflection unit 50, the first imaging lenses 61 and 61', the second imaging lenses 62 and 62', the folding mirrors M1, M2, M3, M4, M'1, M'2, M'3, and M'4, and the dustproof glasses 80A, 80B, 80C, and 80D.

In the optical scanning apparatus 400 according to this embodiment, the incident optical system LA1 is formed of the light source 10A, the first aperture stop 41A, the collimator lens 20A, the cylindrical lens 30A, and the second aperture stop 42. Further, in the optical scanning apparatus 400 according to this embodiment, the incident optical system LA2 is formed of the light source 10B, the first aperture stop 41B, the collimator lens 20B, the cylindrical lens 30B, and the second aperture stop 42. Further, in the optical scanning apparatus 400 according to this embodiment, the incident optical system LA3 is formed of the light source 10C, the first aperture stop 41C, the collimator lens 20C, the cylindrical lens 30C, and the second aperture stop 42. Further, in the optical scanning apparatus 400 according to this embodiment, the incident optical system LA4 is formed of the light source 10D, the first aperture stop 41D, the collimator lens 20D, the cylindrical lens 30D, and the second aperture stop 42.

Further, the imaging optical system LB1 is formed of the first imaging lens 61, the second imaging lens 62, and the folding mirror M1, and the imaging optical system LB2 is formed of the first imaging lens 61, the second imaging lens 62, and the folding mirrors M2, M3, and M4. Further, the imaging optical system LB3 is formed of the first imaging lens 61', the second imaging lens 62', and the folding mirrors M'2, M'3, and M'4, and the imaging optical system LB4 is formed of the first imaging lens 61', the second imaging lens 62', and the folding mirror M'1.

As illustrated in FIG. 26, the optical axis of the incident optical system LA1 of the optical scanning apparatus 400 according to this embodiment is inclined by 3° relative to the main scanning section, and the optical axis of the incident optical system LA2 is inclined by 3° relative to the main scanning section. The optical axes of the incident optical system LA1 and the incident optical system LA2 are set so as to be made incident on the main scanning section from mutually different sides. Further, although not shown, in the same manner, the optical axis of the incident optical system LA3 is inclined by 3° relative to the main scanning section, and the optical axis of the incident optical system LA4 is inclined by 3° relative to the main scanning section. The optical axes of the incident optical system LA3 and the incident optical system LA4 are set so as to be made incident on the main scanning section from mutually different sides. Further, the optical axes of the incident optical system LA1 and the incident optical system LA4 are set so as to be made incident on the main scanning section from the same side, and the optical axes of the incident optical system LA2 and the incident optical system LA3 are set so as to be made incident on the main scanning section from the same side.

The optical scanning apparatus 400 according to this embodiment is formed so as to be able to scan the four scanned surfaces 70A, 70B, 70C, and 70D by one deflection unit 50 in the same manner as the optical scanning apparatus 300 according to the third embodiment.

Figure 27:
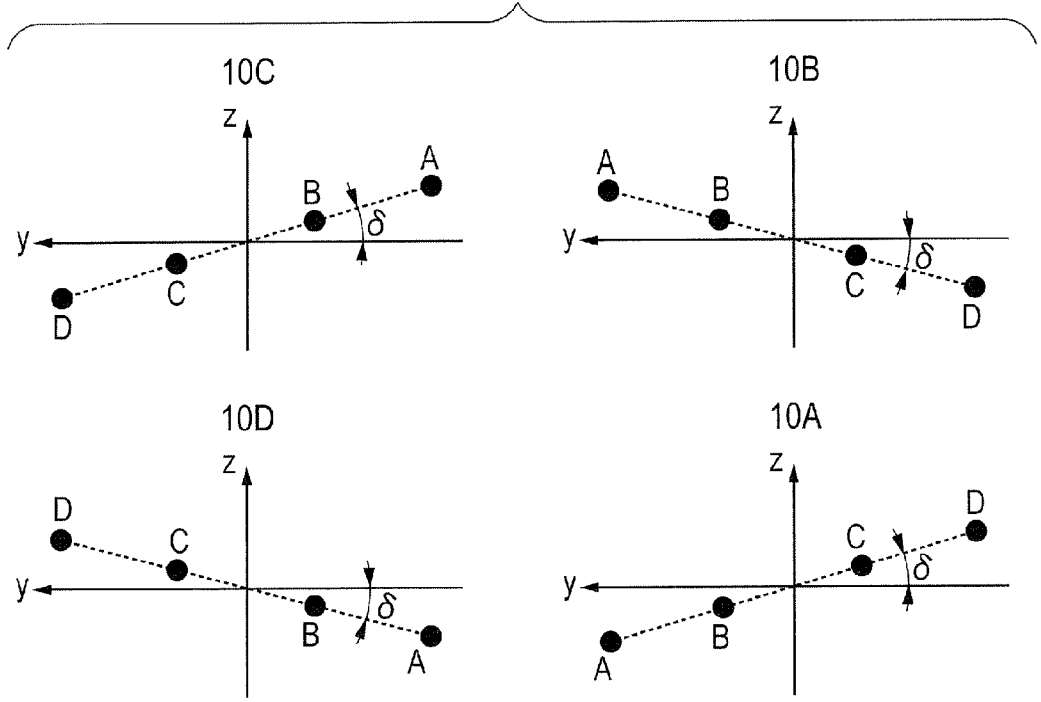
FIG. 27 is a diagram for illustrating arrangements of four light-emitting parts when viewed from a light source side.

FIG. 27 is a diagram for illustrating the arrangement of four light-emitting parts A, B, C, and D when viewed from a side of the light sources 10A to 10D.

As illustrated in FIG. 27, the four light-emitting parts A to D of the light sources 10A to 10D of the optical scanning apparatus 400 according to this embodiment are arrayed in a line at intervals of 30 μm. Therefore, if the four light-emitting parts A to D are arrayed along the sub-scanning direction, the interval (pitch) between the scanning lines along the sub-scanning direction on the scanned surfaces 70A to 70D becomes far larger than the desired interval defined based on the record density. Therefore, the inclination angle δ is adjusted to 7.56° so that the interval between the scanning lines along the sub-scanning direction between the adjacent light-emitting parts on the scanned surfaces 70A to 70D becomes the interval of 21.2 μm between the scanning lines at a time of a desired resolution of 1,200 dpi. Therefore, the four light-emitting parts A to D are also spaced apart along the main scanning direction.

In the optical scanning apparatus 400 according to this embodiment, the first imaging lens 61 and the second imaging lens 62 are shared by two imaging optical systems LB1 and LB2. Further, the second imaging lens 62 is a multi-stage toric lens formed by connecting two optical surfaces along the sub-scanning direction as an incident surface 62a and an exit surface 62b. The incident surface 62a and the exit surface 62b of the second imaging lens 62 are formed of optical surface shapes in which a part (upper side of FIG. 25) corresponding to the optical path RA through which the light fluxes RAa, RAb, RAc, and RAd emitted from the light source 10A pass and a part (lower side of FIG. 25) corresponding to the optical path RB through which the light fluxes RBa, RBb, RBc, and RBd emitted from the light source 10B pass are defined independently of each other. In this case, the incident surface and the exit surface corresponding to the optical path RA are set as 62au and 62bu, respectively, and the incident surface and the exit surface corresponding to the optical path RB are set as 62al and 62bl, respectively. Further, a part 62u of the second imaging lens 62 includes the incident surface 62au and the exit surface 62bu, and a part 62l of the second imaging lens 62 includes the incident surface 62al and the exit surface 62bl.

Further, the first imaging lens 61' and the second imaging lens 62' are shared by two imaging optical systems LB3 and LB4, and are the same as the first imaging lens 61 and the second imaging lens 62 that are arranged by being reversed in the sub-scanning direction, respectively. The second imaging lens 62' is a multi-stage toric lens formed by connecting two optical surfaces along the sub-scanning direction as an incident surface 62'a and an exit surface 62'b. The incident surface 62'a and the exit surface 62'b of the second imaging lens 62' are formed of optical surface shapes in which a part (lower side of FIG. 25) corresponding to the optical path RC through which the light fluxes RCa, RCb, RCc, and RCd emitted from the light source 10C pass and a part (upper side of FIG. 25) corresponding to the optical path RD through which the light fluxes RDa, RDb, RDc, and RDd emitted from the light source 10D pass are defined independently of each other. In this case, the incident surface and the exit surface corresponding to the optical path RC are set as 62'al and 62'bl, respectively, and the incident surface and the exit surface corresponding to the optical path RD are set as 62'au and 62'bu, respectively. Then, a part 62'u of the second imaging lens 62' includes the incident surface 62'au and the exit surface 62'bu, and a part 62'l of the second imaging lens 62' includes the incident surface 62'al and the exit surface 62'bl.

The meridional shape and the sagittal shape of each of the optical surfaces 61a, 61b, 62au, 62al, 62bu, 62bl, 61'a, 61'b, 62'au, 62'al, 62'bu, and 62'bl are expressed by Expressions (1), (2), and (3) in the same manner as in the first embodiment.

In other words, more specifically, the imaging optical system LB1 is formed of the first imaging lens 61, the part 62u of the second imaging lens 62, and the folding mirror M1. Further, the imaging optical system LB2 is formed of the first imaging lens 61, the part 62l of the second imaging lens 62, and the folding mirrors M2, M3, and M4. Further, the imaging optical system LB3 is formed of the first imaging lens 61', the part 62'l of the second imaging lens 62', and the folding mirrors M'2, M'3, and M'4. Further, the imaging optical system LB4 is formed of the first imaging lens 61', the part 62'u of the second imaging lens 62', and the folding mirror M'1.

After passing through the incident optical system LA1, the light fluxes RAa to RAd emitted from the light-emitting parts A to D of the light source 10A are deflected by the deflection unit 50, and condensed onto the scanned surface 70A by the imaging optical system LB1. After passing through the incident optical system LA2, the light fluxes RBa to RBd emitted from the light-emitting parts A to D of the light source 10B are deflected by the deflection unit 50, and condensed onto the scanned surface 70B by the imaging optical system LB2. After passing through the incident optical system LA3, the light fluxes RCa to RCd emitted from the light-emitting parts A to D of the light source 10C are deflected by the deflection unit 50, and condensed onto the scanned surface 70C by the imaging optical system LB3. After passing through the incident optical system LA4, the light fluxes RDa to RDd emitted from the light-emitting parts A to D of the light source 10D are deflected by the deflection unit 50, and condensed onto the scanned surface 70D by the imaging optical system LB4.

Table 3 is for showing various characteristics of the respective optical systems of the optical scanning apparatus 400 according to the fourth embodiment.

TABLE 3

| Configuration of incident optical system/imaging optical system | | | | | Data on optical surface of imaging optical system | | | | | |
|---|---|---|---|---|---|---|---|---|---|---|
| | | | | | First imaging lens | | Second imaging lens | | | |
| | | | | | 61a surface | 61b surface | 62bu surface | 62au surface | 62a1 surface | 62b1 surface |
| Wavelength of light source 10 | λ (nm) | 790 | | | | | | | | |
| Number of light-emitting parts | n | 4 | | | | | | | | |
| Thickness of laser cover glass | deg (mm) | 0.25000 | Meridional line | R | −1.25360E+02 | −5.27439E+01 | −1.33380E+03 | −4.10321E+02 | −4.10321E+02 | −1.33380E+03 |
| Refractive index of laser cover glass | n0 | 1.51052 | | K | −5.59437E+00 | −1.44728E+00 | 3.17881E+02 | 3.88084E+00 | 3.88084E+00 | 3.17881E+02 |
| Distance between light-emitting part and first surface of cemented collimator lens 20 | d0 (mm) | 30.28000 | | B2 | 0.00000E+00 | 0.00000E+00 | 0.00000E+00 | 0.00000E+00 | 0.00000E+00 | 0.00000E+00 |
| Curvature radius of first surface of cemented collimator lens 20 | R0 (mm) | 43.63203 | | B4 | −1.28176E−06 | −7.84072E−07 | −4.81076E−07 | 6.78750E−08 | 6.78750E−08 | −4.81076E−07 |
| Curvature radius of second surface of cemented collimator lens 20 | R1 (mm) | 15.51899 | | B6 | 1.79257E−10 | 1.25268E−10 | 3.47898E−11 | −3.49110E−11 | −3.49110E−11 | 3.47898E−11 |
| Curvature radius of third surface of cemented collimator lens 20 | R2 (mm) | −21.48725 | | B8 | 0.00000E+00 | −4.48618E−13 | −3.45206E−15 | 0.00000E+00 | 0.00000E+00 | −3.45206E−15 |
| Distance between first surface and second surface of cemented collimator lens 20 | d12 (mm) | 1.00000 | | B10 | 0.00000E+00 | 1.59340E−16 | −4.51342E−19 | 0.00000E+00 | 0.00000E+00 | −4.51342E−19 |
| Distance between second surface and third surface of cemented collimator lens 20 | d23 (mm) | 2.00000 | | B12 | 0.00000E+00 | 0.00000E+00 | 0.00000E+00 | 0.00000E+00 | 0.00000E+00 | 0.00000E+00 |
| Refractive index of first surface and second surface of cemented collimator lens 20 | n12 | 1.78501 | Sagittal line | r | 5.00000E+01 | 5.00000E+01 | −3.58999E+01 | 7.54378E+01 | 7.54378E+01 | −3.58999E+01 |
| Refractive index of second surface and third surface of cemented collimator lens 20 | n23 | 1.58228 | | k | 0.00000E+00 | 0.00000E+00 | 0.00000E+00 | 0.00000E+00 | 0.00000E+00 | 0.00000E+00 |
| Distance between third surface of cemented collimator lens 20 and first surface of cylindrical lens 30 | d2 (mm) | 52.42000 | | D2u | 0.00000E+00 | 0.00000E+00 | 7.99535E−06 | 5.49938E−04 | 5.49938E−04 | 7.99535E−06 |
| Curvature radius of first surface of cylindrical lens 30 along sub-scanning direction | Rs3 (mm) | 41.03107 | | D4u | 0.00000E+00 | 0.00000E+00 | 1.69514E−08 | −4.67265E−08 | −4.67265E−08 | 1.69514E−08 |

TABLE 3-continued

| Configuration of incident optical system/imaging optical system | | | Data on optical surface of imaging optical system | | | | | |
|---|---|---|---|---|---|---|---|---|
| | | | First imaging lens | | Second imaging lens | | | |
| | | | 61a surface | 61b surface | 62au surface | 62bu surface | 62a1 surface | 62b1 surface |
| Wavelength of light source 10 | λ (nm) | 790 | | | | | | |
| Number of light-emitting parts | n | 4 | | | | | | |
| Curvature radius of first surface of cylindrical lens 30 along main scanning direction | Rm3 (mm) | ∞ | 0.00000E+00 | 0.00000E+00 | 1.83114E-10 | -1.15805E-11 | 1.83114E-10 | -1.15805E-11 |
| Curvature radius of second surface of cylindrical lens 30 along sub-scanning direction | Rs4 (mm) | ∞ | 0.00000E+00 | 0.00000E+00 | -1.17123E-13 | -2.09852E-16 | -1.17123E-13 | -2.09852E-16 |
| Curvature radius of second surface of cylindrical lens 30 along main scanning direction | Rm4 (mm) | ∞ | 0.00000E+00 | 0.00000E+00 | 3.63256E-17 | 3.42372E-19 | 3.63256E-17 | 3.42372E-19 |
| Thickness of cylindrical lens 30 | d3 (mm) | 3.00000 | 0.00000E+00 | 0.00000E+00 | 0.00000E+00 | 0.00000E+00 | 0.00000E+00 | 0.00000E+00 |
| Refractive index of cylindrical lens 30 | n2 | 1.52397 | 0.00000E+00 | 0.00000E+00 | 0.00000E+00 | 0.00000E+00 | 0.00000E+00 | 0.00000E+00 |
| Distance between light-emitting part and first aperture stop 41 | d4 (mm) | 25.00000 | 0.00000E+00 | 0.00000E+00 | 7.18370E-05 | -9.30317E-05 | 7.18370E-04 | -9.30317E-05 |
| Distance between second surface of cylindrical lens 20 and first aperture stop 42 | d5 (mm) | 28.70000 | 0.00000E+00 | 0.00000E+00 | 2.60413E-07 | 3.16405E-08 | 2.60413E-07 | 3.16405E-08 |
| Distance between second aperture stop 42 and deflecting/reflecting surface 51 on axis | d6 (mm) | 30.00000 | 0.00000E+00 | 0.00000E+00 | 1.47221E-10 | -1.10241E-11 | 1.47221E-10 | -1.10241E-11 |
| Distance between deflecting/reflecting surface 51 on axis and optical surface 61a | d7 (mm) | 30.00000 | 0.00000E+00 | 0.00000E+00 | -1.78410E-14 | 2.45975E-15 | -1.78410E-14 | 2.45975E-15 |
| Thickness of first imaging lens 61 | d8 (mm) | 10.00000 | 0.00000E+00 | 0.00000E+00 | 1.98794E-17 | -2.73640E-19 | 1.98794E-17 | -2.73640E-19 |
| Refractive index of first imaging lens 61 | n3 | 1.52397 | 0.00000E+00 | 0.00000E+00 | 0.00000E+00 | 0.00000E+00 | 0.00000E+00 | 0.00000E+00 |
| Distance between optical surface 61b and optical surface 62a | d9 (mm) | 31.50000 | 0.00000E+00 | 0.00000E+00 | 0.00000E+00 | 0.00000E+00 | 0.00000E+00 | 0.00000E+00 |
| Thickness of second imaging lens 62 | d10 (mm) | 6.50000 | | | 2.01101E-02 | -8.53240E-02 | -2.01101E-02 | 8.53240E-02 |
| Refractive index of second imaging lens 62 | n4 | 1.52397 | | | 7.90851E-06 | 2.44003E-05 | -7.90851E-06 | -2.44003E-05 |
| | G0, 1u | | | | | | | |
| | G2, 1u | | | | | | | |

TABLE 3-continued

| Configuration of incident optical system/imaging optical system | | | Data on optical surface of imaging optical system | | | | | |
|---|---|---|---|---|---|---|---|---|
| | | | First imaging lens | | Second imaging lens | | | |
| | | | 61a surface | 61b surface | 62au surface | 62bu surface | 62a1 surface | 62b1 surface |
| Wavelength of light source 10 | λ (nm) | 790 | | | | | | |
| Number of light-emitting parts | n | 4 | | | | | | |
| Distance between optical surface 62b and first surface of dustproof glass 80 | d11 (mm) | 82.20000 | G4, 1u | | 3.15024E-09 | -4.55838E-09 | -3.15024E-09 | 4.55838E-09 |
| Thickness of dustproof glass 80 | d12 (mm) | 1.80000 | G6, 1u | | -1.20146E-12 | 1.75237E-12 | 1.20146E-12 | -1.75237E-12 |
| Refractive index of dustproof glass 80 | n5 | 1.51052 | G8, 1u | | -1.80945E-16 | -6.72586E-16 | 1.80945E-16 | 6.72586E-16 |
| Distance between second surface of dustproof glass 80 and scanned surface 70 | d13 (mm) | 70.75000 | G10, 1u | | 5.48224E-20 | 7.31189E-20 | -5.48224E-20 | -7.31189E-20 |
| Incident angle in main scanning direction of rotary polygon mirror of incident optical system LA | α (deg) | 84.00000 | G12, 1u | | 0.00000E+00 | 0.00000E+00 | 0.00000E+00 | 0.00000E+00 |
| Incident angle in sub-scanning direction of rotary polygon mirror of incident optical system LA | β (deg) | 3.00000 | G0, 11 | | 2.01101E-02 | -8.53240E-02 | -2.01101E-02 | 8.53240E-02 |
| Effective scanning angle Number of surfaces of rotary polygon mirror 50 | γ (deg) | ±47.166974  4 | G2, 11  G4, 11 | | 1.86999E-05  -3.68692E-09 | 3.18385E-05  -7.59743E-09 | -1.86999E-05  3.68692E-09 | -3.18385E-05  7.59743E-09 |
| Circumradius of rotary polygon mirror 50 | Rpol (mm) | 10.00000 | G6, 11 | | -6.97235E-13 | 8.73412E-13 | 6.97235E-13 | -8.73412E-13 |
| Center position of rotary polygon mirror 50 (in optical axis direction of imaging optical system) | PX (mm) | -6.05000 | G8, 11 | | -9.48843E-17 | -2.96575E-16 | 9.48843E-17 | 2.96575E-16 |
| Center position of rotary polygon mirror 50 (in deflection scanning direction) | PY (mm) | 4.00800 | G10, 11 | | 2.14660E-20 | 1.06073E-20 | -2.14660E-20 | -1.06073E-20 |
| Aperture stop diameter ((second aperture stop) × (first aperture stop)) | Rectangle (mm) | 3.28 × 2.00 | G12, 11 | | 0.00000E+00 | 0.00000E+00 | 0.00000E+00 | 0.00000E+00 |
| | | | G0, 3  G1, 3  G2, 3  G3, 3  G4, 3 | | | 0.00000E+00  -5.64074E-06  1.63665E-08  9.27587E-10  -4.76251E-12 | | 0.00000E+00  5.64074E-06  -1.63665E-08  -9.27587E-10  4.76251E-12 |

*Refractive index is refractive index relative to wavelength of 790 nm

In Table 3, "E±x" represents "$10^{\pm x}$". Further, every coefficient is 0 unless otherwise specified.

Further, the respective coordinate axes X, Y, and Z are defined for the second imaging lenses 62 and 62' as illustrated in FIG. 24 and FIG. 25.

Figure 29A:
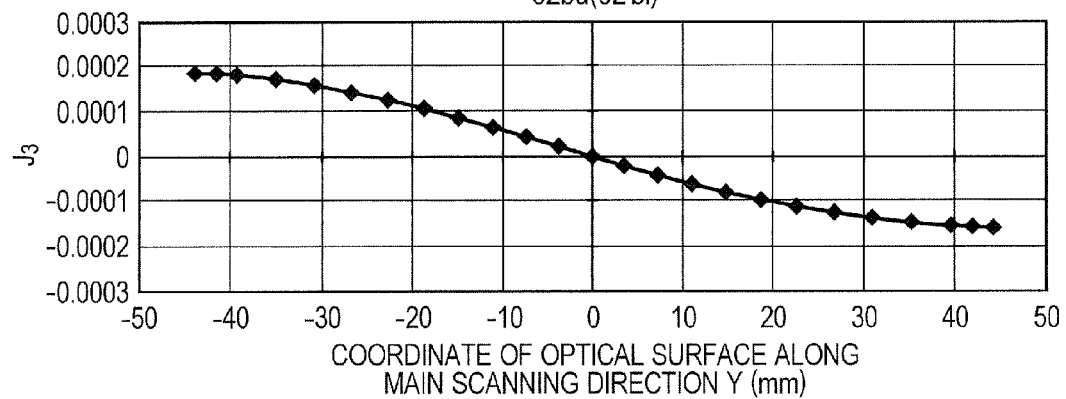
FIG. 29A is a graph for showing a change of $J_3$ with respect to a main scanning direction Y in the optical scanning apparatus according to the fourth embodiment.
Figure 29B:
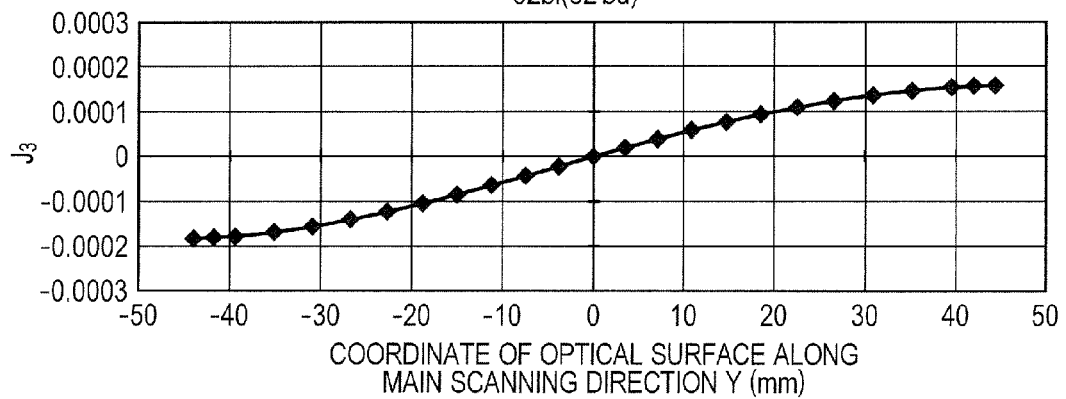
FIG. 29B is a graph for showing a change of $J_3$ with respect to the main scanning direction Y in the optical scanning apparatus according to the fourth embodiment.

FIG. 29A and FIG. 29B are graphs for showing the change in $J_3$ with respect to the main scanning direction Y in the optical scanning apparatus 400 according to this embodiment.

In the optical scanning apparatus 400 according to this embodiment, in the exit surface 62bu of the part 62u of the second imaging lens 62 and the exit surface 62'bl of the part 62'l of the second imaging lens 62', $J_3$ is changed asymmetrically along the main scanning direction as shown in FIG. 29A. Specifically, the sign of $J_3$ is negative at the effective range end portion (upper side of FIG. 24) on the anti-light source side of the exit surfaces 62bu and 62'bl. On the other hand, the sign of $J_3$ is positive at the effective range end portion (lower side of FIG. 24) on the light source side. Thus, the sign of the light source side end portion is set to be opposite to that of the anti-light source side end portion.

On the other hand, in the optical scanning apparatus 400 according to this embodiment, in the exit surface 62bl of the part 62l of the second imaging lens 62 and the exit surface 62'bu of the part 62'u of the second imaging lens 62', $J_3$ is changed asymmetrically along the main scanning direction as shown in FIG. 29B. Specifically, the sign of $J_3$ is positive at the effective range end portion (upper side of FIG. 24) on the anti-light source side of the exit surfaces 62bl and 62'bu. On the other hand, the sign of $J_3$ is negative at the effective range end portion (lower side of FIG. 24) on the light source side. Thus, the sign of the light source side end portion is set to be opposite to that of the anti-light source side end portion.

In this manner, by changing $J_3$ asymmetrically along the main scanning direction, it is possible to reduce the varying amount of the interval between the scanning lines due to the assembly error, the manufacturing error, or the like.

Figure 30:
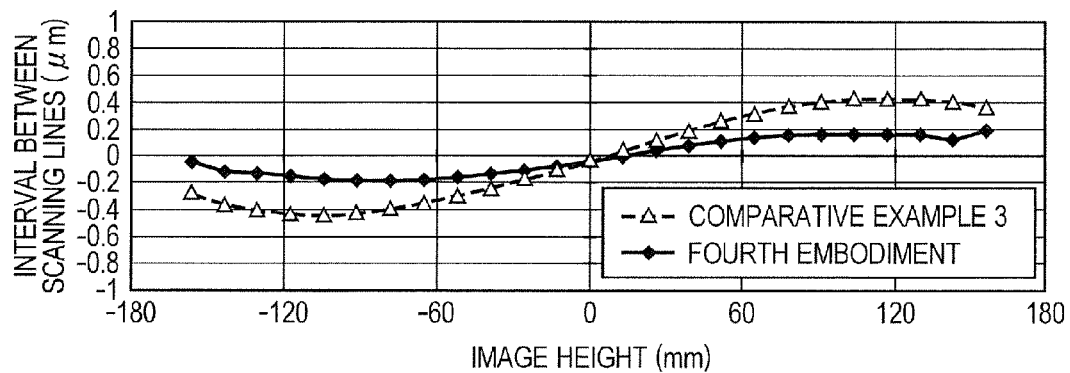
FIG. 30 is a graph for showing an interval between the scanning lines of light fluxes Ra and Rd with each image height on the scanned surface, which is obtained when optical paths RA and RC shift toward a positive direction in a coordinate axis Z and optical paths RB and RD shift toward a negative direction thereof respectively by 0.1 mm in a second imaging lens of the optical scanning apparatus according to the fourth embodiment.

FIG. 30 is a graph for showing the interval between the scanning lines of the light fluxes R(A, B, C, D)a and R(A, B, C, D)d with each image height on the scanned surfaces 70A to 70D, which is obtained when the optical paths RA and RC shift toward a positive direction in the coordinate axis Z and the optical paths RB and RD shift toward a negative direction thereof by 0.1 mm each in the second imaging lenses 62 and 62'. Note that, in FIG. 30, Comparative Example 3 in which the sagittal shapes of the optical surfaces 62bu, 62bl, 62'bu, and 62'bl of the second imaging lenses 62 and 62' do not have a 3rd-order non-circular shape is also shown for the sake of comparison.

Further, in order to obtain a positive value as the interval between the scanning lines, a value obtained by subtracting the imaging position of the light-emitting part A from the imaging position of the light-emitting part D along the sub-scanning direction is used for the optical paths RA and RC, and a value obtained by subtracting the imaging position of the light-emitting part D from the imaging position of the light-emitting part A is used for the optical paths RB and RD. Further, those values are all the same.

As shown in FIG. 30, compared to the comparative example, it is understood that, in this embodiment, the varying amount of the interval between the scanning lines can be reduced by changing $J_3$ asymmetrically along the main scanning direction.

Figure 28:
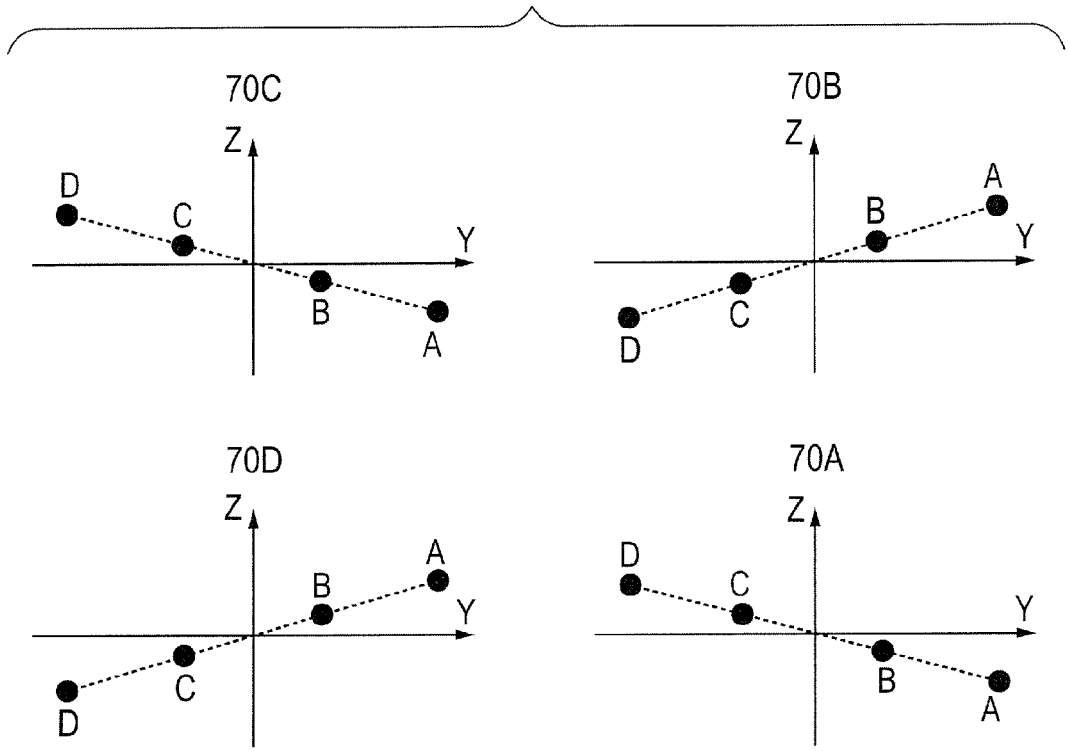
FIG. 28 is a diagram for illustrating positions in which light fluxes emitted from the four light-emitting parts of the light source are imaged on the scanned surfaces.

FIG. 28 is a diagram for illustrating the positions in which the light fluxes emitted from the four light-emitting parts A, B, C, and D of the light sources 10A, 10B, 10C, and 10D are imaged on the scanned surfaces 70A, 70B, 70C, and 70D.

In this case, as the coordinate axes the respective scanned surfaces 70A to 70D, the same coordinate axes as those for the corresponding second imaging lenses 62 and 62' are defined. However, the same coordinate axes referred to in this case are the coordinate axes that are the same after the directions of positive and negative of the respective coordinate axes are matched with each other also in consideration of the reversal of the coordinate axes based on the folding mirrors M1 to M4 and M'1 to M'4 arranged in the respective optical paths. In other words, the same coordinate axes that are defined for the scanned surfaces 70A to 70D corresponding to the second imaging lenses 62 and 62' also in consideration of the reversal due to the folding mirrors M1 to M4 and M'1 to M'4 are illustrated in FIG. 25.

In this manner, when the same coordinate axes are defined for the scanned surfaces 70A to 70D corresponding to the second imaging lenses 62 and 62' also in consideration of the reversal of the coordinate axes due to the folding of the optical paths by the folding mirrors M1 to M4 and M'1 to M'4, the inclination directions of the changes in $J_3$ of the respective optical surfaces 62bu, 62bl, 62'bu, and 62'bl (FIG. 29A and FIG. 29B) are set to have the same signs as the inclination directions of the imaging positions in which the light fluxes emitted from four light-emitting parts A to D of the corresponding light sources 10A to 10D, respectively, are imaged on the scanned surfaces 70A to 70D (FIG. 28). With this configuration, it is possible to reduce the varying amount of the interval between the scanning lines.

Further, in this embodiment, the varying amount $W_{var}$ of the wavefront aberration amount along the sub-scanning direction is $0.24\lambda$, and the enlargement ratio of the spot diameter is suppressed to 3.3%, which can suppress the deterioration of the printing performance.

As described above, also in the optical scanning apparatus 400 in which the four scanned surfaces 70A, 70B, 70C, and 70D are scanned by one deflection unit 50, the shape within the sub-scanning section of the optical surface of at least one imaging lens included in the corresponding imaging optical systems LB1, LB2, LB3, and LB4 has the non-circular shape including at least one order of the odd-numbered orders equal to or higher than the 3rd order, and by changing the non-circular shape asymmetrically along the main scanning direction, it is possible to reduce the varying amount of the interval between the scanning lines due to the assembly error, the manufacturing error, or the like. Therefore, it is possible to suppress the deterioration of the printing performance.

Note that, this embodiment is not limited thereto, and various changes can be made thereto appropriately.

Figure 31:
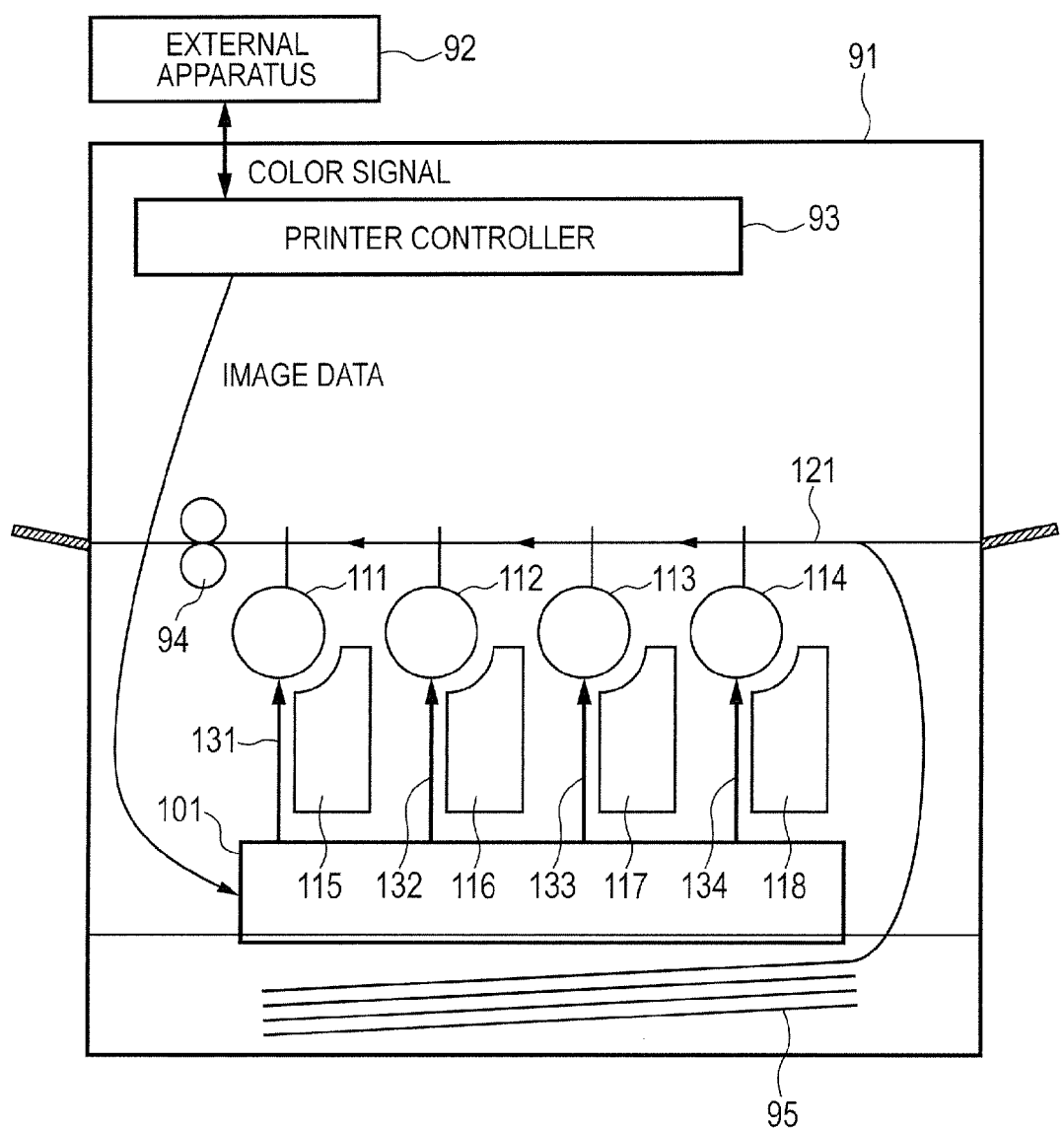
FIG. 31 is a schematic diagram of a main part of a color image forming apparatus in which the optical scanning apparatus according to the present invention is mounted.

FIG. 31 is a schematic diagram of a main part of a color image forming apparatus 91 in which the optical scanning apparatus according to the present invention is mounted. The color image forming apparatus according to the present invention is a tandem color image forming apparatus in which a plurality of optical scanning apparatus are arrayed, the plurality of optical scanning apparatus being configured to concurrently record image information on the respective photosensitive drum surfaces serving as image bearing members.

The color image forming apparatus 91 includes an optical scanning apparatus 101 according to the present invention and photosensitive drums (photosensitive bodys) 111, 112, 113, and 114 serving as the image bearing members. Further, the color image forming apparatus 91 includes developing devices 115, 116, 117, and 118, a conveyor belt 121, a fixing device 94, and a sheet cassette 95.

Respective color signals (code data) of red (R), green (G), and blue (B) output from an external apparatus 92 such as a personal computer are input to the color image forming apparatus 91. Those color signals are converted into respective pieces of image data (image signals) of cyan (C), magenta (M), yellow (Y), and black (K) by a printer controller 93 within the apparatus. Those pieces of image data are each input to the optical scanning apparatus 101. Then, light beams 131, 132, 133, and 134 modulated in accordance with the respective pieces of image data are emitted from the optical scanning apparatus 101, and photosensitive surfaces of the photosensitive drums 111, 112, 113, and 114 are scanned by those light beams in the main scanning direction.

The photosensitive drums 111 to 114 are rotated by the motor (not shown). Then, in accordance with the rotation, the photosensitive surfaces of the photosensitive drums 111 to 114 are moved against the light beams 131 to 134 in the sub-scanning direction orthogonal to the main scanning direction. Below the photosensitive drums 111 to 114, charging rollers (not shown) configured to uniformly charge the surfaces of the photosensitive drums 111 to 114 are arranged so as to be brought into abutment therewith. Then, the light beams 131 to 134 emitted from the optical scanning apparatus 101 are applied to the surfaces of the photosensitive drums 111 to 114 charged by the charging rollers.

As described above, the light beams 131 to 134 are modulated based on the image data, and by applying the light beams 131 to 134, electrostatic latent images are formed on the surfaces of the photosensitive drums 111 to 114, namely, the photosensitive surfaces. The electrostatic latent images are developed as toner images by the developing devices 115 to 118 disposed so as to be brought into abutment with the photosensitive drums 111 to 114 on a further downstream side of application positions of the light beams 131 to 134 in a rotational direction of the photosensitive drums 111 to 114.

The toner images developed by the developing devices 115 to 118 are sequentially transferred onto paper (not shown) serving as a material to be subjected to transfer by a transfer roller (transfer device) (not shown) disposed so as to be opposed to the photosensitive drums 111 to 114 above the photosensitive drums 111 to 114. The paper is received inside the sheet cassette 95 on an upstream side of the photosensitive drums 111 to 114 (on a lower side thereof in FIG. 19), but can be manually fed. A sheet feeding roller (not shown) is disposed at the end portion of the sheet cassette 95. The paper inside the sheet cassette 95 is sent onto the conveyor belt 121 by the sheet feeding roller, and the conveyor belt 121 conveys the paper to the photosensitive drums 111 to 114.

As described above, the paper onto which the unfixed toner image has been transferred is further conveyed to the fixing device 94 on a downstream side of the photosensitive drums 111 to 114 (on a left side thereof in FIG. 19). The fixing device 94 is formed of a fixing roller including a fixing heater (not shown) therein and a pressure roller disposed so as to be brought into press contact with the fixing roller. Then, the fixing device 94 fixes the unfixed toner image onto the conveyed paper by heating the paper while pressurizing the paper at a press contact portion between the fixing roller and the pressure roller. In addition, a delivery roller (not shown) is disposed after the fixing device 94, and delivers the fixed paper to an outside of the image forming apparatus 91.

Note that, the printer controller 93 not only converts data as described above but also controls the motors configured to drive the photosensitive drums 111 to 114, each component within the image forming apparatus 91, a polygon motor within the optical scanning apparatus 101, and the like.

Further, for example, a color image reading apparatus including a CCD sensor may be used as the external apparatus 92. In this case, a color digital copying machine is formed of the color image reading apparatus and the color image forming apparatus 91.

With the optical scanning apparatus according to the present invention, it is possible to provide the optical scanning apparatus capable of reducing unevenness in the intervals between a plurality of scanning lines along the sub-scanning direction due to the manufacturing error, the assembly error, or the like without lowering a design degree of freedom for the incident optical system while maintaining a small size and low cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-129335, filed Jun. 24, 2014, which is hereby incorporated by reference herein in its entirety.

What is claimed is:
1. An optical scanning apparatus, comprising:
a light source comprising a plurality of light-emitting parts;
a deflection unit configured to deflect a plurality of light fluxes emitted from the light source; and
an imaging optical system configured to condense the plurality of light fluxes deflected by the deflection unit onto a scanned surface, wherein:
the imaging optical system comprises an imaging optical element;
the imaging optical element comprises an optical surface whose shape within a sub-scanning section has a non-circular shape;
assuming that a coordinate along a main scanning direction is Y and a coordinate along a sub-scanning direction is Z and that, within the sub-scanning section, a curvature radius on an optical axis of the optical surface is r, an eccentricity is k, a coefficient of variation in the curvature radius of the optical surface is $D_i$, and an aspherical surface coefficient is $G_{mn}Y^m$, when a shape S of the optical surface within the sub-scanning section is defined by an expression:

$$S = \frac{\frac{Z^2}{r'}}{1 + \sqrt{1 - (1+k)\left(\frac{Z}{r'}\right)^2}} + \sum_{n=1}^{16} \sum_{m=0}^{16} G_{mn} Y^m Z^n,$$

$$r' = r\left(1 + \sum_{i=2}^{14} D_i Y^i\right)$$

the expression comprises a term in which n is an odd number equal to or larger than 3;

the aspherical surface coefficient of at least one of the terms in which n is an odd number equal to or larger than 3 is changed asymmetrically along the main scanning direction; and when wavefront aberration amounts in positions Zmax and Zmin of end portions of the light flux along the sub-scanning direction are set as W(Zmax) [λ] and W(Zmin) [λ], respectively, in an arbitrary position in the optical surface along the main scanning direction, $$\left| \frac{W(Zmax) - W(Zmin)}{2} \right| \le 0.3$$

is satisfied.

2. The optical scanning apparatus according to claim 1, wherein the plurality of light-emitting parts are arranged so as to be spaced apart from one another along the main scanning direction and the sub-scanning direction.

3. The optical scanning apparatus according to claim 1, wherein, when the same coordinate axes as coordinate axes for the optical surface are defined on the scanned surface, an inclination of a straight line obtained by connecting between imaging positions in which the plurality of light fluxes emitted from the plurality of light-emitting parts of the light source are imaged on the scanned surface has the same sign as an inclination of a change in the aspherical surface coefficient of the at least one of the terms along the main scanning direction.

4. The optical scanning apparatus according to claim 3, wherein the optical surface comprises the optical surface through which the light flux having a largest width along the sub-scanning direction passes among the optical surfaces comprised in the imaging optical system.

5. The optical scanning apparatus according to claim 3, wherein an origin of a polynomial expression that defines the shape of the optical surface within the sub-scanning section exists constantly within an area of the optical surface through which the light flux passes.

6. The optical scanning apparatus according to claim 1, wherein the optical surface comprises the optical surface through which the light flux having a largest width along the sub-scanning direction passes among the optical surfaces comprised in the imaging optical system.

7. The optical scanning apparatus according to claim 1, wherein an origin of a polynomial expression that defines the shape of the optical surface within the sub-scanning section exists constantly within an area of the optical surface through which the light flux passes.

8. The optical scanning apparatus according to claim 1, further comprising an incident optical system configured to guide the plurality of light fluxes emitted from the light source to the deflection unit,
wherein the optical axis of incident optical system and a main scanning section are non-parallel with each other.

9. The optical scanning apparatus according to claim 8, wherein:
the incident optical system comprises:
a cylindrical lens configured to condense the light flux within the sub-scanning section; and
an aperture stop configured to define a light flux width along the sub-scanning direction; and
wherein the aperture stop is arranged between the cylindrical lens and the deflection unit.

\* \* \* \* \*